US012708494B2

(12) United States Patent
Saphier

(10) Patent No.: US 12,708,494 B2
(45) Date of Patent: Aug. 18, 2026

(54) INTRAORAL 3D SCANNER WITH INACCURATE FOCUS LENS

(71) Applicant: Align Technology, Inc., San Jose, CA (US)

(72) Inventor: Ofer Saphier, Rechovot (IL)

(73) Assignee: Align Technology, Inc., San Jose, CA (US)

( * ) Notice: Subject to any disclaimer, the term of this patent is extended or adjusted under 35 U.S.C. 154(b) by 189 days.

(21) Appl. No.: 18/414,289

(22) Filed: Jan. 16, 2024

(65) Prior Publication Data

US 2024/0268936 A1 Aug. 15, 2024

Related U.S. Application Data

(60) Provisional application No. 63/485,155, filed on Feb. 15, 2023.

(51) Int. Cl.
*A61C 9/00* (2006.01)
*G06T 7/00* (2017.01)

(52) U.S. Cl.
CPC .............. *A61C 9/0066* (2013.01); *G06T 7/00* (2013.01); *G06T 2200/04* (2013.01); *G06T 2207/10028* (2013.01); *G06T 2207/30036* (2013.01)

(58) Field of Classification Search
CPC ......... A61C 9/0066; A61C 9/006; G06T 7/00; G06T 2200/04; G06T 2207/10028; G06T 2207/30036
USPC .......................................................... 382/154
See application file for complete search history.

(56) References Cited

U.S. PATENT DOCUMENTS

| | | | |
|---|---|---|---|
| 6,099,314 | A | 8/2000 | Kopelman et al. |
| 6,334,772 | B1 | 1/2002 | Taub et al. |
| 6,334,853 | B1 | 1/2002 | Kopelman et al. |
| 6,463,344 | B1 | 10/2002 | Pavlovskaia et al. |
| 6,542,249 | B1 | 4/2003 | Kofman et al. |
| 6,633,789 | B1 | 10/2003 | Nikolskiy et al. |
| 6,664,986 | B1 | 12/2003 | Kopelman et al. |
| 6,697,164 | B1 | 2/2004 | Babayoff et al. |
| 6,845,175 | B2 | 1/2005 | Kopelman et al. |
| 6,979,196 | B2 | 12/2005 | Nikolskiy et al. |
| 7,030,383 | B2 | 4/2006 | Babayoff et al. |
| 7,202,466 | B2 | 4/2007 | Babayoff et al. |
| 7,255,558 | B2 | 8/2007 | Babayoff et al. |
| 7,286,954 | B2 | 10/2007 | Kopelman et al. |
| 7,319,529 | B2 | 1/2008 | Babayoff |

(Continued)

*Primary Examiner* — Ali Bayat
(74) *Attorney, Agent, or Firm* — Lowenstein Sandler LLP

(57) ABSTRACT

An intraoral scanner includes one or more structured light projectors, a camera, and control circuitry. The structured light projector(s) are to project a pattern of light onto an intraoral 3D surface. The camera comprises a focusing lens configured to focus at a plurality of different focal depths, each associated with a distinct optical distortion. The camera captures of at least a portion of the pattern of light projected onto the intraoral 3D surface at one or more of the different focal depths. The control circuitry is to change a focus position of the focusing lens to cause the camera to capture the images of the intraoral three-dimensional surface at the one or more different focal depths, wherein the change in the focus position causes a change in optical distortion for the camera and a corresponding change in a calibration of the camera associated with the change in the optical distortion.

27 Claims, 15 Drawing Sheets

(56) References Cited

U.S. PATENT DOCUMENTS

| | | | |
|---|---|---|---|
| 7,373,286 | B2 | 5/2008 | Nikolskiy et al. |
| 7,507,088 | B2 | 3/2009 | Taub et al. |
| 7,545,372 | B2 | 6/2009 | Kopelman et al. |
| 7,698,068 | B2 | 4/2010 | Babayoff |
| 7,916,911 | B2 | 3/2011 | Kaza et al. |
| 8,108,189 | B2 | 1/2012 | Chelnokov et al. |
| 8,244,028 | B2 | 8/2012 | Kuo et al. |
| 8,587,582 | B2 | 11/2013 | Matov et al. |
| 8,948,482 | B2 | 2/2015 | Levin |
| D742,518 | S | 11/2015 | Barak et al. |
| 9,192,305 | B2 | 11/2015 | Levin |
| 9,261,356 | B2 | 2/2016 | Lampert et al. |
| 9,261,358 | B2 | 2/2016 | Atiya et al. |
| 9,299,192 | B2 | 3/2016 | Kopelman |
| D760,901 | S | 7/2016 | Barak et al. |
| 9,393,087 | B2 | 7/2016 | Moalem |
| 9,408,679 | B2 | 8/2016 | Kopelman |
| 9,431,887 | B2 | 8/2016 | Boltanski |
| 9,439,568 | B2 | 9/2016 | Atiya et al. |
| 9,451,873 | B1 | 9/2016 | Kopelman et al. |
| D768,861 | S | 10/2016 | Barak et al. |
| D771,817 | S | 11/2016 | Barak et al. |
| 9,491,863 | B2 | 11/2016 | Boltanski |
| D774,193 | S | 12/2016 | Makmel et al. |
| 9,510,757 | B2 | 12/2016 | Kopelman et al. |
| 9,660,418 | B2 | 5/2017 | Atiya et al. |
| 9,668,829 | B2 | 6/2017 | Kopelman |
| 9,675,430 | B2 | 6/2017 | Verker et al. |
| 9,693,839 | B2 | 7/2017 | Atiya et al. |
| 9,717,402 | B2 | 8/2017 | Lampert et al. |
| 9,724,177 | B2 | 8/2017 | Levin |
| 9,844,426 | B2 | 12/2017 | Atiya et al. |
| 10,076,389 | B2 | 9/2018 | Wu et al. |
| 10,098,714 | B2 | 10/2018 | Kuo |
| 10,108,269 | B2 | 10/2018 | Sabina et al. |
| 10,111,581 | B2 | 10/2018 | Makmel |
| 10,111,714 | B2 | 10/2018 | Kopelman et al. |
| 10,123,706 | B2 | 11/2018 | Elbaz et al. |
| 10,136,972 | B2 | 11/2018 | Sabina et al. |
| 10,380,212 | B2 | 8/2019 | Elbaz et al. |
| 10,390,913 | B2 | 8/2019 | Sabina et al. |
| 10,453,269 | B2 | 10/2019 | Furst |
| 10,456,043 | B2 | 10/2019 | Atiya et al. |
| 10,499,793 | B2 | 12/2019 | Ozerov et al. |
| 10,504,386 | B2 | 12/2019 | Levin et al. |
| 10,507,087 | B2 | 12/2019 | Elbaz et al. |
| 10,517,482 | B2 | 12/2019 | Sato et al. |
| 10,695,150 | B2 | 6/2020 | Kopelman et al. |
| 10,708,574 | B2 | 7/2020 | Furst et al. |
| 10,772,506 | B2 | 9/2020 | Atiya et al. |
| 10,813,727 | B2 | 10/2020 | Sabina et al. |
| 10,888,399 | B2 | 1/2021 | Kopelman et al. |
| 10,952,816 | B2 | 3/2021 | Kopelman |
| 10,980,613 | B2 | 4/2021 | Shanjani et al. |
| 11,013,581 | B2 | 5/2021 | Sabina et al. |
| D925,739 | S | 7/2021 | Shalev et al. |
| 11,096,765 | B2 | 8/2021 | Atiya et al. |
| 11,238,586 | B2 | 2/2022 | Minchenkov et al. |
| 11,367,192 | B2 | 6/2022 | Kopelman et al. |
| 11,455,727 | B2 | 9/2022 | Minchenkov et al. |
| 11,478,132 | B2 | 10/2022 | Kopelman et al. |
| 11,563,929 | B2 | 1/2023 | Saphier et al. |
| 11,633,268 | B2 | 4/2023 | Moalem et al. |
| 11,707,238 | B2 | 7/2023 | Moshe et al. |
| RE49,605 | E | 8/2023 | Kopelman |
| 11,744,681 | B2 | 9/2023 | Kopelman et al. |
| 11,759,277 | B2 | 9/2023 | Shalev et al. |
| 11,896,461 | B2 | 2/2024 | Saphier et al. |
| 11,937,996 | B2 | 3/2024 | Peleg |
| 2007/0172112 | A1* | 7/2007 | Paley ................ A61C 13/0022 382/128 |
| 2011/0034176 | A1* | 2/2011 | Lord .................. H04M 1/0264 348/241 |
| 2013/0117377 | A1* | 5/2013 | Miller .................... A63F 13/92 709/205 |
| 2014/0058367 | A1* | 2/2014 | Dantus ................... H01S 3/005 606/4 |
| 2014/0112573 | A1* | 4/2014 | Francis, Jr. ............... G06T 7/55 382/154 |
| 2014/0306866 | A1* | 10/2014 | Miller .................... H04L 67/10 345/8 |
| 2016/0026253 | A1* | 1/2016 | Bradski ................ H04N 13/128 345/8 |
| 2021/0059796 | A1* | 3/2021 | Weiss ................ A61C 13/0004 |
| 2021/0121049 | A1 | 4/2021 | Rudnitsky et al. |
| 2021/0137653 | A1 | 5/2021 | Saphier et al. |
| 2021/0196152 | A1 | 7/2021 | Saphier et al. |

* cited by examiner

CONTROL CIRCUITRY
PROCESSOR

INTRAORAL 3D SCANNER WITH INACCURATE FOCUS LENS

RELATED APPLICATIONS

This patent application claims the benefit under 35 U.S.C. § 119(e) of U.S. Provisional Application No. 63/485,155, filed Feb. 15, 2023, which is incorporated by reference herein.

FIELD

The present disclosure relates generally to three-dimensional imaging, and more particularly to intraoral three-dimensional imaging.

BACKGROUND

Digital dental impressions utilize intraoral scanning to generate three-dimensional digital models of an intraoral three-dimensional surface of a subject. Digital intraoral scanners often use structured light three-dimensional imaging using a combination of structured light projectors and cameras disposed within the intraoral scanner.

US Patent Publication No. 2019/0388193, filed Jun. 19, 2019, to Saphier et al., which is assigned to the assignee of the present application and is incorporated herein by reference, describes an apparatus for intraoral scanning including an elongate wand that has a probe. One or more light projectors and two or more cameras are disposed within the probe. The light projectors each have a pattern generating optical element, which may use diffraction or refraction to form a light pattern. Each camera may be configured to focus between 1 mm and 30 mm from a lens that is farthest from the camera sensor. Other applications are also described.

US Patent Publication No. 2019/0388194, filed Jun. 19, 2019, to Atiya et al., which is assigned to the assignee of the present application and is incorporated herein by reference, describes a wand including a probe at a distal end of the elongate wand. The probe includes a light projector and a light field camera. The light projector includes a light source and a pattern generator configured to generate a light pattern. The light field camera includes a light field camera sensor. The light field camera sensor includes (a) an image sensor including an array of sensor pixels and (b) an array of micro-lenses disposed in front of the image sensor such that each micro-lens is disposed over a sub-array of the array of sensor pixels. Other applications are also described.

US Patent Publication No. 2020/0404243, filed Jun. 23, 2020, to Saphier et al., which is assigned to the assignee of the present application and is incorporated herein by reference, describes a method for generating a 3D image, including driving structured light projector(s) to project a pattern of light on an intraoral 3D surface, and driving camera(s) to capture images, each image including at least a portion of the projected pattern, each one of the camera(s) comprising an array of pixels. A processor compares a series of images captured by each camera and determines which of the portions of the projected pattern can be tracked across the images. The processor constructs a three-dimensional model of the intraoral three-dimensional surface based at least in part on the comparison of the series of images. Other embodiments are also described.

SUMMARY

Applications of the present disclosure include systems and methods related to three-dimensional intraoral scanning using an intraoral scanner that includes one or more structured light projectors and a camera having a lens that is configured to focus at a plurality of different focal depths, e.g., a mechanical autofocus lens, or a liquid lens. The intraoral three-dimensional scanning may be based on (a) each structured light projector projecting a pattern of light defined by a plurality of projector rays onto an intraoral three-dimensional surface being scanned, and (b) the camera capturing an image that depicts at least a plurality of detected features of the projected pattern of light.

Generally speaking, three-dimensional reconstruction of the intraoral three-dimensional surface is achieved by a computer processor computing three-dimensional positions on the intraoral three-dimensional surface of a plurality of features of the pattern of light as detected in an image during the scanning. This computation may be based on known calibration values for the one or more structured light projectors and known calibration values for the camera. However, the use of a lens that is configured to focus at a plurality of different focal depths introduces a challenge, namely, that for each different state of the lens, the lens has (a) a distinct focal depth, and (b) a distinct optical magnification, thus altering the geometric calibration of the camera. Additionally, or alternatively, other optical distortions may change with each change in the focal depth. Therefore, when the state of the lens is changed during a scan this results in the geometric calibration of the camera, on which is based the computation of the three-dimensional positions on the intraoral three-dimensional surface, changing during the scan.

A further challenge presents itself in that the rate of change of the state of the lens may be slower than the frame-rate of the camera. Therefore, when the state of the lens is changed during a scan it may result in image frames being captured while the lens is still changing prior to the lens stabilizing in the target state to which it was changed. A still further challenge presents itself in that the computer processor may not have accurate feedback as to what the current state of the lens is for any given image frame, even once the lens has stabilized in the state to which it was changed.

The inventors have realized a solution to the above-described challenges whereby, even without accurate feedback indicating the current state of the lens for a given image frame, the computer processor computes respective three-dimensional positions on the intraoral three-dimensional surface of a plurality of features of the pattern of light detected in the image. Thus, for some applications of the present disclosure, the computer processor stores (a) calibration values for the one or more structured light projectors, and (b) calibration values for the camera determined for each of a plurality of discrete states Sn of the lens, each discrete state Sn of the lens having a distinct focal depth and distinct optical magnification and/or other distinct optical distortion. For a between-state image captured by the camera when the lens is in an intermediate state Si between two states Sn and Sn+1, the focal depth of the lens in intermediate state Si being between the distinct focal depths of the lens in states Sn and Sn+1, the computer processor computes respective three-dimensional positions on the intraoral three-dimensional surface of a plurality of features of the pattern of light detected in the between-state image based on (i) the stored calibration values for the camera determined for each of a plurality of discrete states Sn of the lens, and (ii) the stored calibration values for the one or more structured light projectors. For example, based on an analysis of the detected features of the projected pattern of light as captured in the between-state image, the computer processor interpolates between the stored calibration values for the two closest discrete states Sn and Sn+1 for which calibration values are stored, thus arriving at calibration values for the camera that are specific to the intermediate state Si of the lens.

There is therefore provided, in accordance with some applications of the present disclosure, an apparatus for intraoral scanning, the apparatus including:

one or more structured light projectors, each structured light projector configured to project a pattern of light defined by a plurality of projector rays, each projector ray projecting a feature of the pattern, when the structured light projector is activated;

a camera including a camera sensor having an array of pixels, wherein:

(a) the camera is configured to capture an image that depicts at least a plurality of detected features of the projected pattern of light on an intraoral three-dimensional surface, and (b) the camera includes a lens that is configured to focus at a plurality of different focal depths, and a computer processor configured to:

(A) store calibration values for the one or more structured light projectors, (B) store calibration values for the camera determined for each of a plurality of discrete states Sn of the lens, each discrete state Sn of the lens having a distinct focal depth and distinct optical magnification and/or other optical distortion, and l for a between-state image captured by the camera when the lens is in an intermediate state Si between two discrete states Sn and Sn+1, the focal depth of the lens in intermediate state Si being between the distinct focal depths of the lens in states Sn and Sn+1, compute respective three-dimensional positions on the intraoral three-dimensional surface of a plurality of features of the pattern of light detected in the between-state image based on (i) the stored calibration values for the camera determined for each of a plurality of discrete states Sn of the lens, and (ii) the stored calibration values for the one or more structured light projectors.

For some applications, the apparatus includes an elongate wand including a probe at a distal end of the wand, and the camera is disposed within the probe.

For some applications, the lens includes a liquid lens, wherein the liquid lens is configured to change state in response to a change in voltage applied to the liquid lens, each state Sn of the liquid lens having a distinct focal depth and distinct optical magnification and/or other optical distortion.

For some applications, the lens is configured to move to a plurality of different positions along an optical axis of the lens, each of the plurality of discrete states Sn of the lens corresponding to a distinct position of the lens, and intermediate state Si of the lens is an intermediate position of the lens that is between two distinct positions of the lens.

For some applications, the plurality of discrete states Sn is exactly two states S1 and S2.

For Some Applications:

(a) the stored calibration values for the camera indicate, for each of the plurality of discrete states Sn of (b) the lens, a camera ray corresponding to each of the pixels, and (c) the stored calibration values for the one or more structured light projectors indicate a projector ray corresponding to each one of the projected features from each one of the one or more structured light projectors, wherein for each of the plurality of discrete states Sn of the lens, each projector ray corresponds to a respective path Pn of pixels on the camera sensor.

For some applications, the computer processor is configured to compute the respective three-dimensional positions on the intraoral three-dimensional surface of the plurality of features of the pattern of light detected in the between-state image by:

solving a correspondence algorithm to assess which projector ray projected each of the plurality of features of the projected pattern, as detected in the between-state image, for each of the plurality of detected features, calculating respective distances D1 and D2 between the detected feature and two closest paths of pixels Pn and Pn+1 on the camera sensor, each path of pixels Pn and Pn+1 corresponding to the projector ray that projected the detected feature for respective discrete states Sn and Sn+1 of the lens, and based on distances D1 and D2 for each of the plurality of detected features, estimating the intermediate state Si of the lens, and updating the stored calibration values to indicate a camera ray corresponding to each pixel on the camera sensor of the camera for the estimated intermediate state Si of the lens, wherein for the estimated intermediate state Si of the lens, each projector ray corresponds to a respective path Pi of pixels on the camera sensor.

For some applications, the computer processor is configured to:

for each of the plurality of detected features, calculate a normalized relative position of the detected feature with respect to the two closest paths of pixels Pn and Pn+1 by normalizing the respective distance D1 with respect to the total distance D1+D2 between the two closest paths of pixels Pn and Pn+1, and based on the average of the normalized relative positions for the plurality of detected features, estimate the intermediate state Si of the lens, and update the stored calibration values to indicate a camera ray corresponding to each pixel on the camera sensor of the camera for the estimated intermediate state Si of the lens.

For Some Applications:

the between-state image is a first between-state image captured by the camera when the lens is in the estimated first intermediate state Si between two discrete states Sn and Sn+1, and the computer processor is configured to compute the respective three-dimensional positions on the intraoral three-dimensional surface of the plurality of features of the pattern of light detected in a second between-state image captured by the camera when the lens is in a second intermediate state Si+1 between discrete states Sn and Sn+1 by:

solving the correspondence algorithm to assess which projector ray projected each of the plurality of features of the projected pattern as detected in the second between-state image by assuming the same solution to the correspondence algorithm as solved for the plurality of features of the projected pattern as detected in the first between-state image, for each of the plurality of detected features in the second between-state image, calculating (a) a distance Di between the detected feature and path Pi of pixels on the camera sensor corresponding to the projector ray that projected the detected feature for the first intermediate state Si, and (b) a distance D2' between the detected feature and closest path of pixels Pn+1 on the camera sensor corresponding to the projector ray that projected the detected feature for the discrete state Sn+1 of the lens, and based on distances Di and D2' for each of the plurality of detected features, estimate the second intermediate state Si+1 of the lens, and update the stored calibration values to indicate a camera ray corresponding to each pixel on the camera sensor of the camera for the estimated second intermediate state Si+1 of the lens, wherein for the estimated second intermediate state Si+1 of the lens, each projector ray corresponds to a respective path Pi+1 of pixels on the camera sensor.

For Some Applications:

the camera is configured to capture a series of images, each image depicting at least a plurality of detected features of the projected pattern of light on the intraoral three-dimensional surface, wherein the between-state image is an image in the series of images, and the computer processor is configured to assess which projector ray projected each of the plurality of detected features of the projected pattern, as detected in the between-state image by:

(a) analyzing the series of images and determining which detected features of the projected pattern, as detected in the between-state image, can be tracked across the series of images, (b) solving a correspondence algorithm for the tracked detected features of the projected pattern in at least one of the images of the series of images other than the between-state image, and (c) using the solved correspondence algorithm for the tracked detected features of the projected pattern to solve the correspondence algorithm for tracked detected features of the projected pattern as detected in the between-state image.

For some applications, the apparatus further includes control circuitry configured to drive the lens to change state, and the computer processor is configured to compute the respective three-dimensional positions on the intraoral three-dimensional surface of the plurality of features of the pattern of light detected in the between-state image by:

generating an initial estimation of intermediate state Si based on a lens-state-change command by the control circuitry, based on the stored calibration values for the camera determined for discrete states Sn and Sn+1, calculating for the initial estimation of intermediate state Si of the lens a respective path Pi of pixels on the camera sensor for each projector ray, comparing the respective positions of the plurality of detected features of the pattern of light detected in the between-state image to respective paths Pi of pixels for the initial estimation of intermediate state Si, and based on the comparing:

re-estimating intermediate state Si, recalculating the respective path Pi of pixels on the camera sensor for each projector ray for the re-estimated intermediate state Si, comparing the respective positions of the plurality of detected features of the pattern of light detected in the between-state image to respective paths Pi of pixels for the re-estimated intermediate state Si, and using a re-estimation of intermediate state Si for which the plurality of features are closer to respective paths Pi of pixels for the re-estimated intermediate state Si than the plurality of features were for the initial estimation of intermediate state Si, solving a correspondence algorithm to assess which projector ray projected each of the plurality of features of the projected pattern, as detected in the between-state image.

For some applications, the computer processor is configured to compute the respective three-dimensional positions on the intraoral three-dimensional surface of the plurality of features of the pattern of light detected in the between-state image by:

based on the stored calibration values for the camera determined for discrete states Sn and Sn+1, for each of a plurality of different intermediate states Si between discrete states Sn and Sn+1, calculating a respective path Pi of pixels on the camera sensor for each projector ray, comparing the respective positions of the plurality of detected features of the pattern of light detected in the between-state image to respective paths Pi of pixels for each of the plurality of intermediate states Si, and using one of the plurality of intermediate states Si for which the plurality of detected features are closer to respective paths Pi of pixels for the one of the plurality of intermediate states Si than the plurality of detected features were for at least one other of the plurality of intermediates state Si, solving a correspondence algorithm to assess which projector ray projected each of the plurality of features of the projected pattern, as detected in the between-state image.

For some applications, the apparatus further includes one or more non-structured light projectors, each non-structured light projector configured to illuminate the intraoral three-dimensional surface with non-structured light, the camera is configured to capture a 2D image of the intraoral three-dimensional surface under the illumination of the non-structured light projector, and for a between-state 2D image captured by the camera when the lens is in an intermediate state between discrete states Sn of the lens, the computer processor is configured to estimate the intermediate state Si of the lens based on image frames captured using the one or more structured light projectors that proceed and follow the capturing of the 2D between-state image.

For Some Applications:

the apparatus further includes control circuitry configured to drive the lens to change state, the stored calibration values for the camera indicate the focal depth of the lens for each of the plurality of discrete states Sn of the lens, and the computer processor is configured to:

based on a previous image frame captured by the camera, compute a 3D point cloud of three-dimensional positions of projected features of the pattern of light on the intraoral three-dimensional surface, and based on the stored calibration values for the camera that indicate the focal depth of the lens for each of the plurality of discrete states Sn, drive the control circuitry to drive the lens to change state to a target intermediate state Sj for which the focal depth of the lens is at a depth that is within the 3D point cloud, the target intermediate state Sj being between two discrete states Sn and Sn+1.

For some applications, the computer processor is configured to, based on the stored calibration values for the camera that indicate the focal depth of the lens for each of the plurality of discrete states Sn, drive the control circuitry to drive the lens to change state to a target intermediate state Sj for which the focal depth of the lens is at the three-dimensional center of the 3D point cloud.

For some applications, the computer processor is configured to (a) filter the 3D point cloud in order to remove from the 3D point cloud features of the pattern of light that were projected onto soft tissue, and (b) drive the control circuitry to drive the lens to change state to a target intermediate state Sj for which the focal depth of the lens is at the three-dimensional center of the filtered 3D point cloud.

For some applications, the computer processor is configured to, based on the stored calibration values for the camera that indicate the focal depth of the lens for each of the plurality of discrete states Sn, optimize focus of the lens over a range of focal depths spanning two points u1 and u2 within the 3D point cloud by driving the control circuitry to drive the lens to change state to a target intermediate state Sj for which the focal depth of the lens is at the harmonic mean between u1 and u2.

For some applications, the computer processor is configured to:

based on the previous image frame, determine a region of interest within the 3D point cloud, and based on the stored calibration values for the camera that indicate the focal depth of the lens for each of the plurality of discrete states Sn, drive the control circuitry to drive the lens to change state to a target intermediate state Sj for which the focal depth of the lens is at a depth that is within the determined region of interest within the 3D point cloud.

For some applications, the computer processor is configured to, based on the stored calibration values for the camera that indicate the focal depth of the lens for each of the plurality of discrete states Sn, drive the control circuitry to drive the lens to oscillate between a plurality of target intermediate states Sj for which the respective focal depths of the lens span a range of depths that are within the 3D point cloud.

For some applications, the computer processor is configured to drive the control circuitry to drive the lens to oscillate between (i) at least one target intermediate state Sj for which the focal depth of the lens is a depth that is nearer than the three-dimensional center of the 3D point cloud and (ii) at least one target intermediate state Sj for which the focal depth of the lens is a depth that is farther than the three-dimensional center of the 3D point cloud.

For Some Applications:

(A) the camera is a first camera and the apparatus further includes a second camera having an array of pixels, wherein the second camera (i) is configured to capture an image that depicts at least a plurality of detected features of the projected pattern of light on the intraoral three-dimensional surface, and (ii) includes a lens that is configured to focus at a plurality of different focal depths, (B) the control circuitry is configured to drive the lens of the second camera to change state, and (C) the computer processor is configured to:

store calibration values for the second camera determined for each of a plurality of discrete states Sn of the lens of the second camera, each discrete state Sn of the lens having a distinct focal depth and distinct optical magnification and/or other optical distortion, wherein the stored calibration values for the second camera indicate the focal depth of the lens for each of the plurality of discrete states Sn of the lens, and based on the stored calibration values for the first and second camera that indicate the respective focal depths of the lens for each of the plurality of discrete states Sn for each of the first and second cameras, drive the control circuitry to (i) drive the lens of the first camera to change state to a target intermediate state Sj1 for which the focal depth of the lens is at a first depth that is within the 3D point cloud, and (ii) drive the lens of the second camera to change state to a target intermediate state Sj2 for which the focal depth of the lens is at a second depth that is within the 3D point cloud.

For some applications, the computer processor is configured to, based on the stored calibration values for the first and second camera that indicate the respective focal depths of the lens for each of the plurality of discrete states Sn for each of the first and second cameras, drive the control circuitry to (i) drive the lens of the first camera to oscillate between a plurality of target intermediate states Sj1 for which the respective focal depths of the lens of first the first camera span a first range of depths that are within the 3D point cloud, and (ii) drive the lens of the second camera to oscillate between a plurality of target intermediate states Sj2 for which the respective focal depths of the lens of the second camera span a second range of depths that are within the 3D point cloud.

The present disclosure will be more fully understood from the following detailed description of applications thereof, taken together with the drawings, in which:

DETAILED DESCRIPTION

Figure 1:
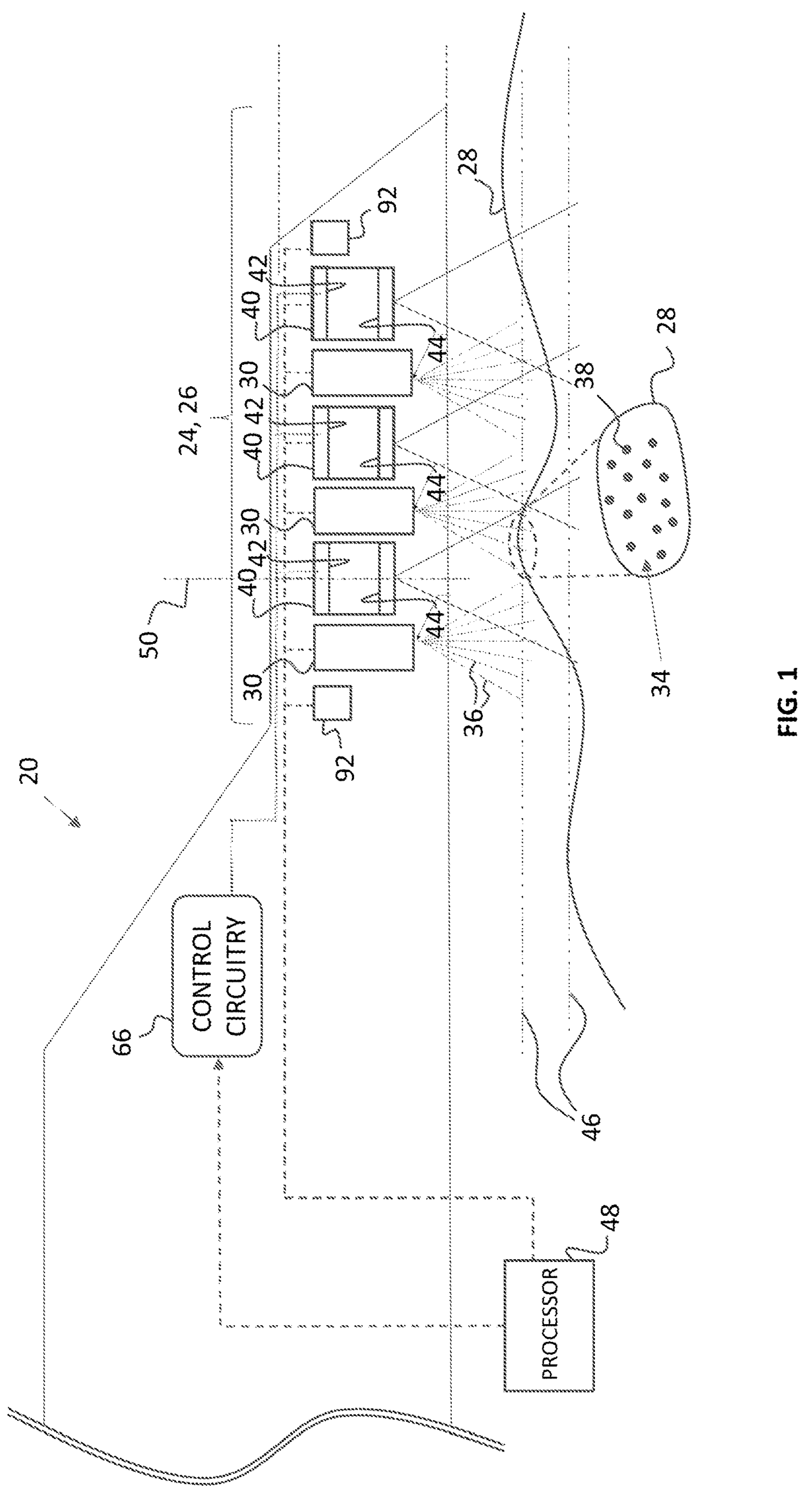
FIG. 1 is a schematic illustration of an elongate wand (e.g., a handheld wand) for intraoral scanning, in accordance with some applications of the present disclosure.

Reference is now made to FIG. 1, which is a schematic illustration of an elongate wand 20 for intraoral scanning (also referred to as an intraoral scanner or simply a scanner), in accordance with some applications of the present disclosure. For some applications, elongate wand 20 has a probe 24 at distal end 26 of wand 20. Elongate wand 20 may be used to obtain scanning data of an intraoral three-dimensional surface 28. Elongate wand 20 includes one or more structured light projectors 30, each structured light projector 30 configured to project a pattern 34 of light defined by a plurality of projector rays 36, each projector ray 36 projecting a feature 38 of the pattern, when structured light projector 30 is activated. Elongate wand 20 further includes a camera 40 having a camera sensor 42 that has an array of pixels. For some applications, camera 40 is disposed within probe 24 of wand 20. During an intraoral scan, camera 40 captures an image that depicts at least a plurality of detected features 38' of the projected pattern 34 of light on intraoral three-dimensional surface 28.

In some applications, camera 40 has a lens 44 that is configured to focus at a plurality of different focal depths 46. By way of example, two focal depths 46 are depicted in FIG. 1. A computer processor 48 stores (i) calibration values for one or more structured light projectors 30, and (ii) calibration values for camera 40 determined for each of a plurality of discrete states Sn of lens 44. In some applications, computer processor 48 is a component of want 20 (e.g., is an internal component of the intraoral scanner). In some applications, computer processor 48 is a component of a computing device that is external to, and connected to, wand 20. Each discrete state Sn of lens 44 has a distinct focal depth 46 and distinct optical magnification and/or other optical distortion. In some instances, the optical distortion includes a size distortion (e.g., a magnification). In some instances, the optical distortion includes a radial distortion (e.g., a barrel distortion, a pincushion distortion, a mustache distortion), etc. that may change with changes in focal depth and/or with changes in magnification. In some instances the optical distortion includes a chromatic aberration, which may change with changes in magnification. For some applications, if an image is captured when lens 44 is in a discrete state Sn then, based on known calibration values for one or more structured light projectors 30 and known calibration values for camera 40 as determined for that discrete state Sn, three-dimensional reconstruction of the intraoral three-dimensional surface is achieved by computer processor 48 computing three-dimensional positions on the intraoral three-dimensional surface of a plurality of features 38 of pattern 34 of light as detected in the image captured by camera 40.

Embodiments are discussed with reference to intraoral scanners having one or more cameras 40 that can be focused to different focal depths, where each of the different focal depths is associated with a different optical magnification. It should be understood that in addition to, or instead of, optical magnification changing with changes in the focal depth (i.e., with changes in a focus setting), other optical distortions may be changed with changes in the focal depth. Examples of such other optical distortions barrel distortion, pincushion distortion, mustache distortion, other radial distortions, chromatic aberration, and so on. Accordingly, any discussion with reference to changes in optical magnification caused by changes in focal depth also applies to other changes in optical distortions caused by changes in focal depth, which may or may not be associated with changes in magnification. Additionally, different calibrations that are used to solve a correspondence algorithm for different focal depths that account for such changes in optical magnification may additionally or alternatively account for such other changes in optical distortions.

However, as described hereinabove, images may be captured during an intraoral scan when lens 44 is not in a discrete state Sn, but rather in an intermediate state Si between two discrete states Sn and Sn+1. For example, lens 44 may be driven to change state to a target intermediate state Si, for which computer processor 48 does not have stored calibration values for camera 40, in order to focus at a specific focal depth 46. Additionally or alternatively, for example, the rate of change of state of lens 44 may be slower than the frame-rate of camera 40, resulting in images frames being captured by camera 40 while lens 44 is still changing prior to lens 44 stabilizing in the target state to which it was changed. Additionally or alternatively, for example, processor 48 may not have accurate feedback as to the current state of lens 44 for any given image.

The inventors have realized a solution in which, based on the captured image, computer processor 48 interpolates between the sets of stored calibration values for a plurality of discrete states Sn in order to obtain calibration values for the current intermediate state Si of lens 44. Thus, for a between-state image captured by camera 40 when lens 44 is in an intermediate state Si between two discrete states Sn and Sn+1, and the focal depth 46 of lens 44 in intermediate state Si is between the distinct focal depths 46 of lens 44 in states Sn and Sn+1, computer processor 48 computes respective three-dimensional positions on intraoral three-dimensional surface 28 of a plurality of features 38 of pattern 34 of light detected in the between-state image based on (i) the stored calibration values for camera 40 determined for each of a plurality of discrete states Sn of lens 44, and (ii) the stored calibration values for structured light projector(s) 30.

For some applications, lens 44 is a liquid lens, which changes state in response to a change in voltage applied to the liquid lens. The voltage acts to change the surface tension of the liquid of the liquid lens. Each voltage applied to the liquid lens yields a different steady state lens shape. Each state Sn of the liquid lens has a distinct focal depth and distinct optical magnification and/or other optical distortion.

For some applications, lens 44 is configured to move to a plurality of different positions along an optical axis 50 of lens 44, each of the plurality of discrete states Sn of lens 44 corresponding to a distinct position of lens 44, and intermediate state Si of lens 44 is an intermediate position of lens 44 that is between two distinct positions of lens 44. For example, a voice coil may be used to move lens 44 to different positions. The voice coil is connected to a spring, and a voltage applied to the voice coil determines a force that acts on the spring. The balance between the spring force and the magnetic force defines a steady state position of the lens for a given current.

It is noted that as used throughout the present application, including in the claims, use of the word "lens" may refer to (i) a plurality of optical elements that combine to form the lens of a camera, e.g., a compound lens, or (ii) a single optical element. For some applications, camera 40 may have a compound lens, of which one optical element in the compound lens is a liquid lens.

For some applications, calibration values for camera 40 are stored for exactly two states S1 and S2 of lens 44. For example, calibration values for camera 40 may be stored for the respective edge states of lens 44 corresponding to nearest and farthest focal depths 46 of lens 44. In the case of a lens 44 that moves to a plurality of different positions along optical axis 50 of lens 44, states S1 and S2 may correspond to the nearest and farthest positions along optical axis 50 to which lens 44 is able to move. In the case of a liquid lens 44, states S1 and S2 may correspond to states in which the voltage applied to liquid lens 44 is, respectively, (i) less than a minimum voltage required for the liquid lens to change state from a first edge state and (ii) more than a voltage required for the liquid lens to stay at a second edge state opposite from the first edge state.

Figure 2B:
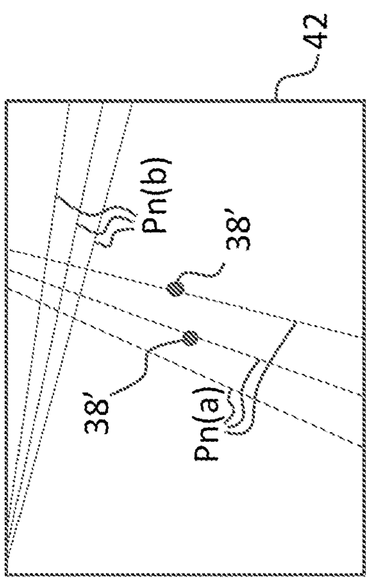
FIG. 2B is a schematic illustration of the camera sensor showing a plurality of respective paths of pixels corresponding to projector rays from different structured light projectors, in accordance with some applications of the present disclosure.
Figure 2A:
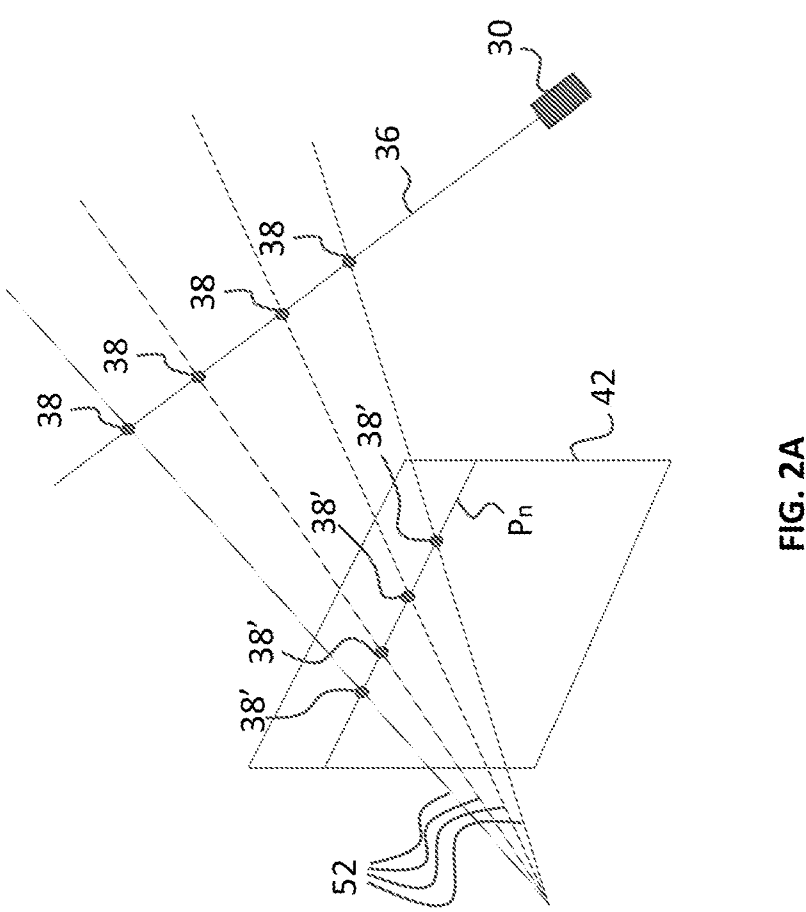
FIG. 2A is a schematic illustration of a projector ray from a structured light projector projecting features at different distances from the structured light projector, and a camera sensor of a camera detecting the projected features, in accordance with some applications of the present disclosure.

Reference is now made to FIGS. 2A-B. FIG. 2A is a schematic illustration of (a) a projector ray 36 from a structured light projector 30 projecting features 38 at different distances from structured light projector 30 and (b) camera sensor 42 of camera 40 detecting features 38', in accordance with some applications of the present disclosure. FIG. 2B is a schematic illustration of camera sensor 42, showing a plurality of respective paths Pn of pixels corresponding to projector rays 36 from different structured light projectors 30, in accordance with some applications of the present disclosure. Camera sensor 42 of camera 40 has an array of pixels, for each of which there exists a corresponding camera ray 52. Similarly, for each projected feature 38 from each structured light projector 30 there exists a corresponding projector ray 36. Each projector ray 36 corresponds to a respective path Pn of pixels on camera sensor 42. Thus, as illustrated by FIG. 2A, if camera 40 sees a feature 38' projected by a specific projector ray 36, that detected feature 38' will be detected by a pixel on the specific path Pn of pixels that corresponds to that specific projector ray 36.

Thus, for some applications, (a) the stored calibration values for camera 40 indicate, for each of the plurality of discrete states Sn of lens 44, a camera ray 52 corresponding to each of the pixels on camera sensor 42, and (b) the stored calibration values for structured light projector(s) 30 indicate a projector ray 36 corresponding to each one of the projected features 38 from each one of structured light projector(s) 30. For each of the plurality of discrete states Sn of lens 44, each projector ray 36 corresponds to a respective path Pn of pixels on camera sensor 42.

FIG. 2B shows a plurality of respective paths Pn(a) of pixels on camera sensor 42 corresponding to projector rays 36 from a first structured light projector 30(*a*), and a plurality of respective paths Pn(b) of pixels on camera sensor 42 corresponding to projector rays 36 from a second structured light projector 30(*b*). Each path Pn corresponds to single projector ray 36. Two detected features 38' are shown as projected from two respective projector rays 36 from structured light projector 30-*a*. As elongate wand 20 is moved around the intraoral cavity during a scan, the depth at which projector rays 36 hit the intraoral three-dimensional surface change. Detected features 38' projected from a particular projector ray 36 will be seen on camera sensor 42 as moving along the path Pn of pixels corresponding to that particular projector ray 36. It is noted that, as shown in FIG. 2B, the detected features 38' may not be exactly on their respective paths Pn of pixels due to noise in the signal and the quality of the detected feature 38'.

Figure 3:
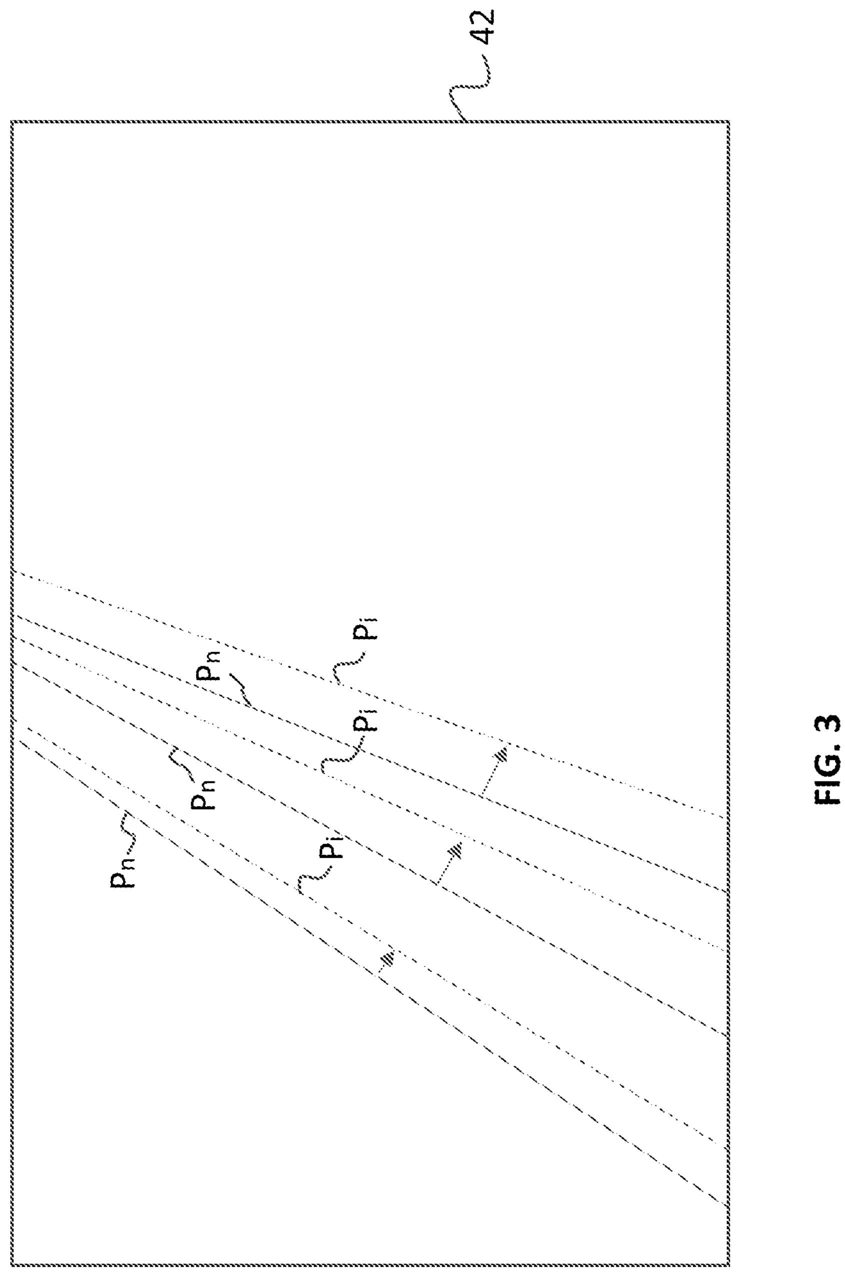
FIG. 3 is a schematic illustration of the camera sensor showing respective paths of pixels corresponding to projector rays of a given structured light projector for two different states of a lens of the camera, in accordance with some applications of the present disclosure.

Reference is now made to FIG. 3, which is a schematic illustration of camera sensor 42 showing respective paths Pn and Pi of pixels corresponding to projector rays 36 of a given structured light projector 30 for two different states Sn and Si of lens 44, in accordance with some applications of the present disclosure. As described hereinabove, when lens 44 changes state the focal depth of lens 44 changes as well as the optical magnification and/or other optical distortion(s) of lens 44, thus altering the calibration values for camera 40. Since the calibration values for camera 40 define the camera rays for each pixel on camera sensor 42, a change in the calibration values results in a change in the position of the respective paths of pixels corresponding to each projector ray 36. FIG. 3 shows paths Pn of pixels corresponding to three respective projector rays 36 from a given structured light projector 30 when lens 44 of camera 40 is in state Sn. When lens 44 of camera 40 changes state, for example to an intermediate state Si, the paths of pixels on camera sensor 42 corresponding to the projector rays shift. FIG. 3 shows paths Pi of pixels corresponding to the same three respective projector rays 36 from the given structured light projector 30 when lens 44 of camera 40 is in an intermediate state Si.

Figure 4:
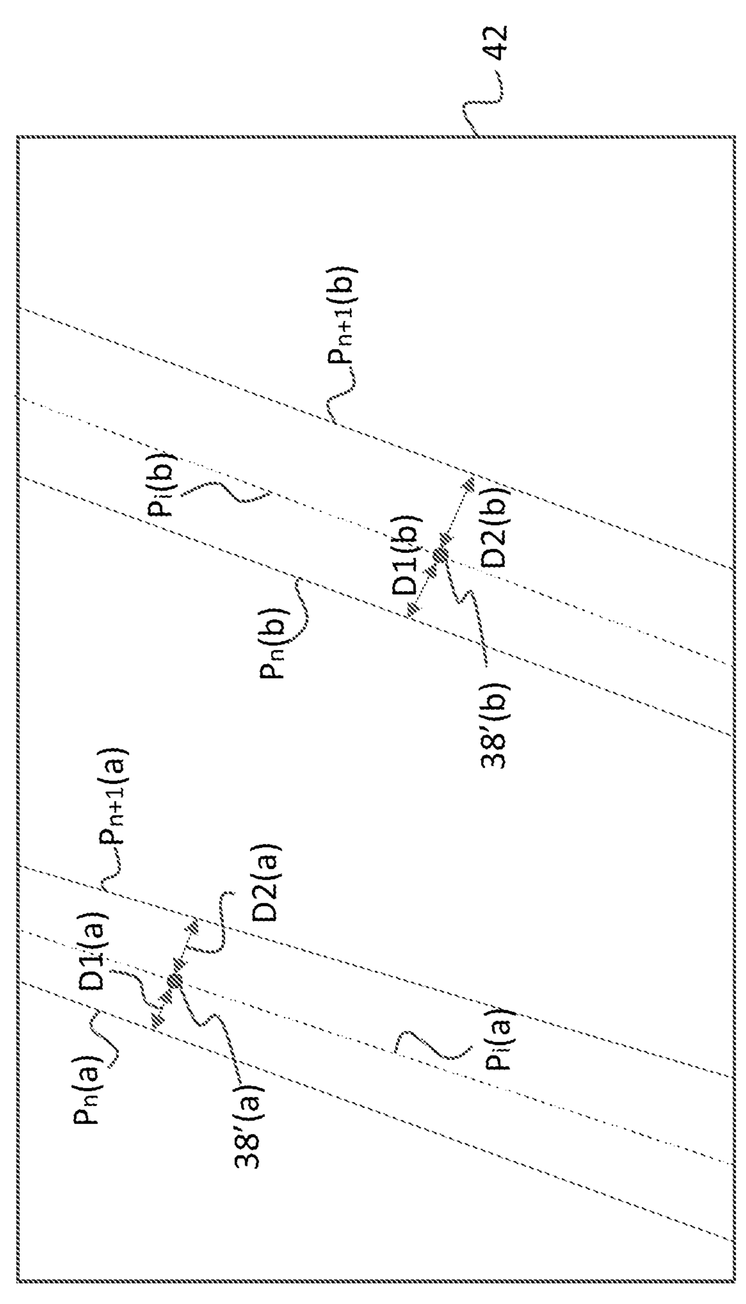
FIG. 4 is a schematic illustration of the camera sensor depicting a plurality of detected features as captured in a between-state image, in accordance with some applications of the present disclosure.

Reference is now made to FIG. 4, which is a schematic illustration of camera sensor 42 depicting, for two different projector rays 36(*a*) and 36(*b*), detected features 38'(*a*) and 38'(*b*) as captured in a between-state image, along with respective paths of pixels Pn and Pn+1 corresponding to each of the projector rays for the two nearest discrete states Sn and Sn+1 of lens 44, in accordance with some applications of the present disclosure. The inventors have realized that, based on (a) the stored calibration values of the structured light projectors 30 and (b) the stored calibration values for camera 40 corresponding to a plurality of discrete states Sn of lens 44, an analysis of the detected features 38' as captured in a between-state image allows computer processor 48 to estimate the intermediate state Si of lens 44 for that between-state image. That is, in some applications based on only the information provided by a single image-frame, computer processor 48 estimates the intermediate state Si of lens 44 for that specific image-frame (further described hereinbelow). Based on the estimated intermediate state Si, computer processor 48 interpolates between the two nearest sets of stored calibration values for the two closest discrete states Sn and Sn+1, thus arriving at calibration values for camera 40 that are specific to the intermediate state Si of the lens 44 for that given between-state image. Computer processor 48 then uses the interpolated calibration values corresponding to intermediate state Si of lens 44 in order to compute the respective three-dimensional positions on the intraoral three-dimensional surface of the detected features 38' as captured in the between-state image.

For some applications, computer processor 48 determines the intermediate state Si of lens 44 by comparing the location of a detected feature 38' on camera sensor 42 to the two closest paths of pixels Pn and Pn+1 on camera sensor 42 corresponding to the specific projector ray 36 which projected the feature 38 for two respective discrete states Sn and Sn+1 of lens 44. Based on distances D1 and D2 of the detected feature 38' from the two closest paths Pn and Pn+1, respectively, computer processor 48 estimates the intermediate state Si of lens 44, and uses the estimated state Si to update the stored calibration values for camera 40 in order to obtain specific calibration values for camera 40 corresponding to intermediate state Si of lens 44 (further described hereinbelow). Based on the updated stored calibration values of camera 40 for the estimated intermediate state Si of lens 44, each projector ray 36 corresponds to a respective path Pi of pixels on camera sensor 42.

In some applications, a correspondence algorithm is first solved in order to assess which projector ray 36 projected each of a plurality of features 38 of projected pattern 34, as detected in a between-state image. The example shown in FIG. 4 shows two detected features 38'(*a*) and 38'(*b*), each projected by a respective projector ray 36(*a*) and 36(*b*). After the correspondence algorithm is solved computer processor 48 knows which of the two detected features was projected by projector ray 36(*a*) and which of the two detected features was projected by projector ray 36(*b*). It is noted that FIG. 4 shows only two features of the pattern as a simplified example. The correspondence algorithm may be solved using techniques described in US 2019/0388193 to Saphier et al., US 2019/0388194 to Atiya et al., and US 2020/0404243 to Saphier et al.

After correspondence is solved, for each of a plurality of detected features 38', computer processor 48 calculates respective distances D1 and D2 between each detected feature 38' and the two closest paths of pixels Pn and Pn+1 on camera sensor 42, each path of pixels Pn and Pn+1 corresponding to the projector ray 36 that projected the detected feature 38' for respective discrete states Sn and Sn+1 of lens 44. As shown in the example in FIG. 4, (i) distance D1(*a*) is calculated between detected feature 38'(*a*) and path of pixels Pn(a) corresponding to projector ray 36(*a*) for discrete state Sn of lens 44, and (ii) distance D2(*a*) is calculated between detected feature 38'(*a*) and path of pixels Pn+1(a) corresponding to projector ray 36(*a*) for discrete state Sn+1 of lens 44. Similarly, (i) distance D1(*b*) is calculated between detected feature 38'(*b*) and path of pixels Pn(b) corresponding to projector ray 36(*b*) for discrete state Sn of lens 44, and (ii) distance D2(*b*) is calculated between detected feature 38'(*b*) and path of pixels Pn+1(b) corresponding to projector ray 36(*b*) for discrete state Sn+1 of lens 44. Distances D1 and D2 for the plurality of detected features 38' provide an indication of the intermediate state Si of lens 44 relative to the two closest discrete states Sn and Sn+1 for which computer processor 48 has stored calibration values for camera 40. Thus, based on distances D1 and D2 for each of the plurality of detected features 38', computer processor 48 estimates the intermediate state Si of lens 44, and updates the stored calibration values to indicate a camera ray 52 corresponding to each pixel on camera sensor 42 of camera 40 for the estimated intermediate state Si of lens 44.

For some applications, for each of the plurality of detected features 38', computer processor 48 calculates a normalized relative position of the detected feature 38' with respect to the two closest paths of pixels Pn and Pn+1, e.g., by normalizing the respective distance D1 with respect to the total distance D1+D2 between the two closest paths of pixels Pn and Pn+1. Based on the average of the normalized relative positions for the plurality of detected features 38', computer processor 48 estimates the intermediate state Si of lens 44, and updates the stored calibration values to indicate a camera ray 52 corresponding to each pixel on camera sensor 42 of camera 40 for the estimated intermediate state Si of lens 44.

Thus, by averaging the normalized relative positions of the plurality of detected features 38', each with respect to their respective two closest paths of pixels Pn and Pn+1, a single parameter is obtained based on which computer processor 48 updates the stored calibration values for camera 40. For some applications each camera ray 52, corresponding to each pixel of camera sensor 42, is a specific ray in three-dimensional space that can be defined with 5 parameters. For each different state of lens 44, camera ray 52 for each pixel of camera sensor 42 would have different sets of 5 parameters.

For example, for any given state S of lens 44, there is a vector P of length 5 for each pixel on camera sensor 42 that defines camera ray 52 for that pixel. By averaging the normalized relative positions of the plurality of detected features 38', each with respect to their respective two closest paths of pixels Pn and Pn+1, a single parameter t is obtained. Once t is obtained, computer processor 48 uses t to estimate the intermediate state Si of lens 44:

$$t=(S_{n+1}-Si)/(S_{n+1}-S_n) \quad \text{[Eqn. 1]}$$

where Si is the intermediate state Si of lens 44 for a given between-state image captured by camera 40, and Sn and Sn+1 are the two closest neighboring states of lens 44 for which computer processor 48 has stored calibration values for camera 40. Once computer processor 48 has estimated the intermediate state Si of lens 44 using parameter t, computer processor 48 interpolates between the sets of parameters that define camera rays 52 for each of the two nearest states Sn and Sn+1 and recalculates the vector for each pixel on camera sensor 42 that defines camera ray 52 for that pixel as follows:

$$Pi=t\times P_n+(1-t)\times P_{n+1} \quad \text{[Eqn. 2]}$$

where for intermediate state Si of lens 44 there is a vector Pi of length 5 that defines a camera ray 52 for each pixel on camera sensor 42. The inventors have also realized that in order to reduce the error in estimating intermediate state Si of lens 44 it is advantageous to use many detected features 38' projected by a plurality of structured light projectors 30.

As described hereinabove, the first step in computing the three-dimensional positions on the intraoral three-dimensional surface of detected features 38' as detected in a between-state image is to solve the correspondence algorithm in order to determine which projector rays projected each feature 38. For some applications, as per techniques described in US 2019/0388193 to Saphier et al., US 2019/0388194 to Atiya et al., and US 2020/0404243 to Saphier et al., an input to the correspondence algorithm may be the path of pixels that the detected feature 38' appears on. That is, one of the ways in which computer processor 48 may determine that projected feature 38 is from a particular projector ray 36 is by seeing that the detected feature 38' appears on the path of pixels corresponding to that particular projector ray 36. However, as described hereinabove, as lens 44 changes state the path of pixels on camera sensor 42 for each projector ray 36 shifts. The inventors have realized a hypothetical challenge in which the path of pixels for each projector ray 36 shifts in such a manner as to introduce a confusion as to which feature 38 was projected by which projector ray 36. In the event that this occurs, the inventors have realized a number of solutions described hereinbelow.

Figure 5:
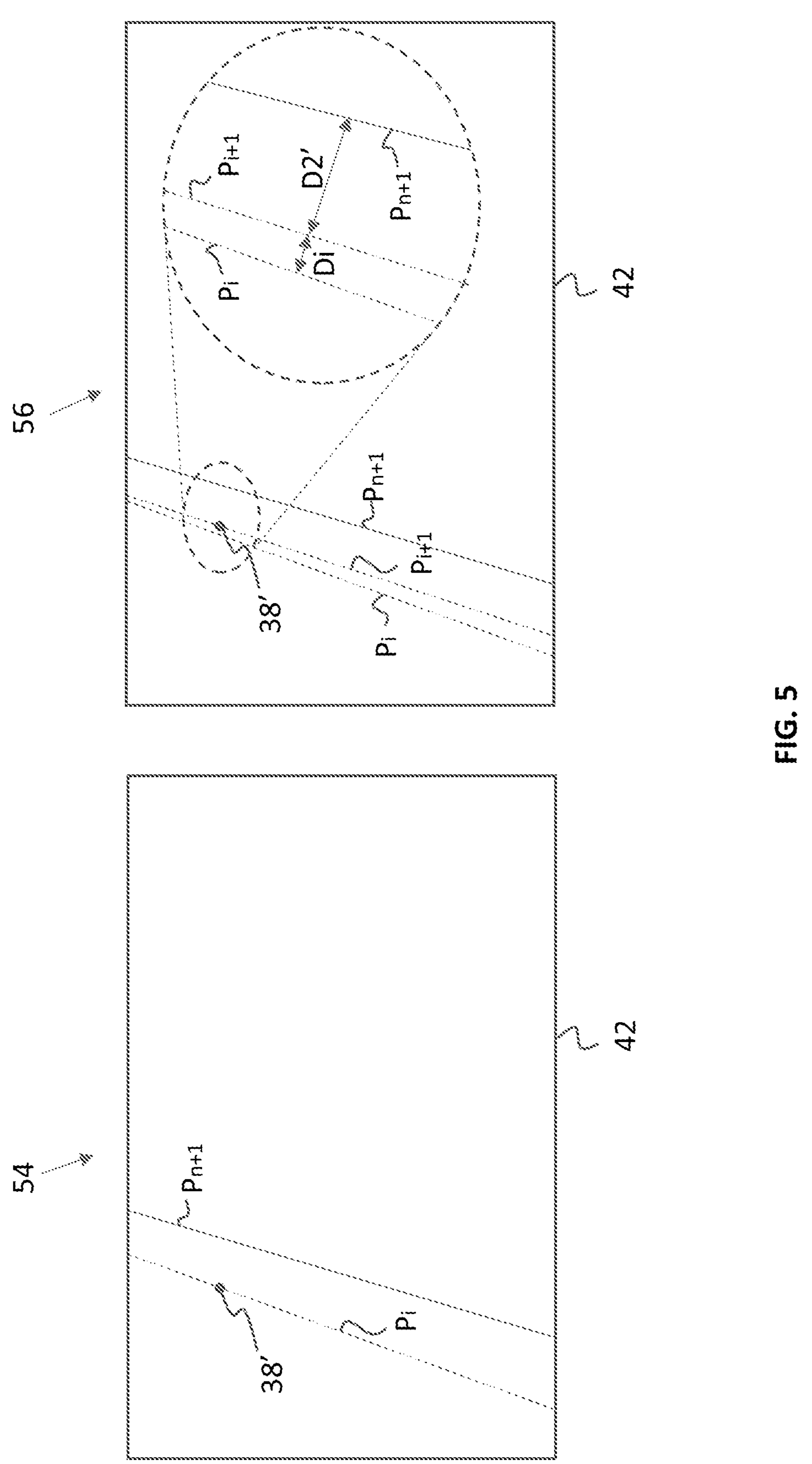
FIG. 5 is a schematic illustration of the camera sensor depicting a detected feature as captured in two consecutive between-state images, in accordance with some applications of the present disclosure.

Reference is now made to FIG. 5, which is a schematic illustration of camera sensor 42 depicting a solution by which computer processor 48 may compute the respective three-dimensional positions on intraoral three-dimensional surface 28 for between-state images without actively solving the correspondence algorithm for each between-state image, in accordance with some applications of the present disclosure. For some applications, due to the rate of change of state of lens 44 being slower than the frame rate of camera 40, as lens 44 changes state a plurality, e.g., a series, of between-state images are captured, where for each between-state image lens 44 is in an intermediate state Si between two discrete states Sn and Sn+1. Furthermore, due to the slower rate of change of lens 44, for each intermediate state Si+1 of lens 44 across the plurality of between-state images, the path of pixels Pi+1 on camera sensor 42, corresponding to each projector ray 36 for the given intermediate state Si+1, shifts only a small amount relative to the path of pixels Pi on camera sensor 42 corresponding to each projector ray 36 for the immediately preceding intermediate state Si in the plurality of between-state images.

Thus, for each detected feature 38' the solution to the correspondence algorithm can be assumed to be the same as for the previously solved intermediate state Si of lens 44. Additionally, after solving the intermediate states Si of lens 44 in a first one of the plurality of between-state images, the next intermediate state Si+1 for a second of the plurality of between-state images may be estimated by calculating the distances of each of a plurality of detected features 38' as detected in the second between-state image from (i) the path of pixels Pi of the previously solved intermediate state Si and (ii) one closest path of pixels Pn+1 for the closest discrete state Sn+1. The intermediate states Si+1 of lens 44 can be iteratively estimated this way across a series of between-state images, each time calculating the distance of the detected features 38' from the path of pixels Pi of the previously solved intermediate state Si.

FIG. 5 shows a simplified example with one detected feature 38' as detected in (i) a first between-state image 54, in which lens 44 is in an estimated first intermediate state Si between two discrete states Sn and Sn+1, and (ii) a second between-state image 56 in which lens 44 is in a second intermediate state Si+1 between discrete states Sn and Sn+1. Computer processor 48 is configured to compute the respective three-dimensional positions on intraoral three-dimensional surface 28 of a plurality of features 38' of pattern 34 of light detected in second between-state image 56 captured by camera 40 by:

(I) solving the correspondence algorithm to assess which projector ray 36 projected each of the plurality of features 38' as detected in second between-state image 56 by assuming the same solution to the correspondence algorithm as solved for the plurality of features 38' as detected in first between-state image 54, (II) for each of the plurality of detected features 38' in second between-state image 56, calculating (a) a distance Di between the detected feature 38' and path Pi of pixels on camera sensor 42 corresponding to projector ray 36 that projected the detected feature 38' for the first intermediate state Si, and (b) a distance D2' between the detected feature 38' and closest path of pixels Pn+1 on camera sensor 42 corresponding to projector ray 36 that projected the detected feature 38' for the discrete state Sn+1 of lens 44, and (III) based on distances Di and D2' for each of the plurality of detected features 38' detected in second between-state image 56, estimate the second intermediate state Si+1 of lens 44, and update the stored calibration values (as described hereinabove with reference to FIG. 4) to indicate a camera ray 52 corresponding to each pixel on camera sensor 42 of camera 40 for the estimated second intermediate state Si+1 of lens 44, such that for the estimated second intermediate state Si+1 of the lens, each projector ray 36 corresponds to a respective path of pixels Pi+1 on camera sensor 42.

Figure 6:
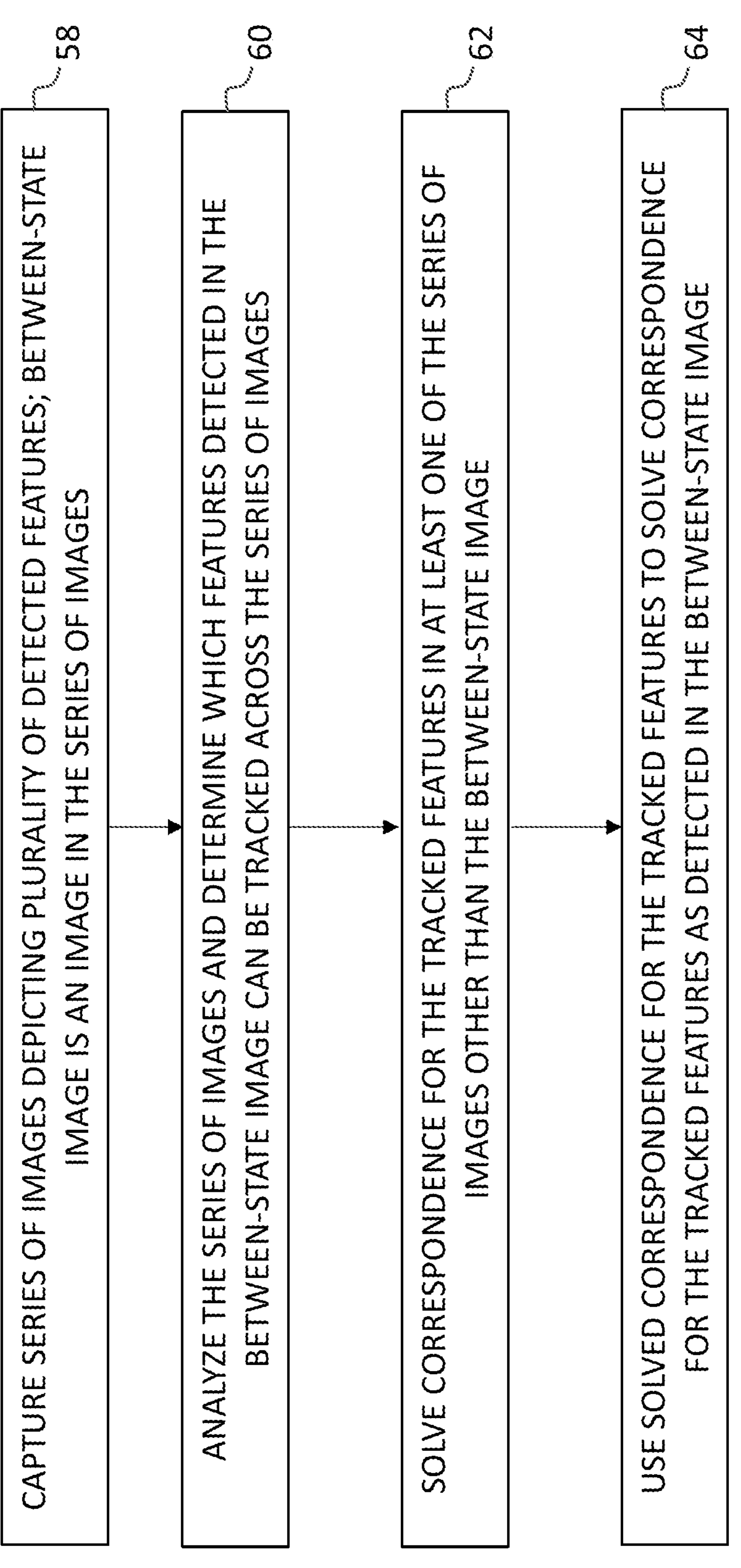
FIGS. 6 and 7A are flowcharts depicting steps performed by a computer processor, in accordance with some applications of the present disclosure.

Reference is now made to FIG. 6, which is a flowchart depicting steps performed by computer processor 48 for solving the correspondence algorithm for detected features 38' as detected in a between-state image, in accordance with some applications of the present disclosure. For some applications, correspondence in the between-state image may be solved by tracking at least a subset of the detected features 38' from previous image frames in which the correspondence was solved. If a given detected feature 38' of projected pattern 34 can be tracked across a series of images for which correspondence was solved for at least one of the images in the series, then computer processor 48 automatically knows which projector ray 36 projected the given detected feature 38' as detected in images of the series for which correspondence was not solved. For some applications, techniques such as those described in US 2020/0404243 to Saphier et al. may be used for tracking detected features 38' through a series of images.

Thus, for some applications, camera 40 captures a series of images (step 58), each image depicting at least a plurality of detected features 38' of projected pattern 34 of light on intraoral three-dimensional surface 28, the between-state image being an image in the series of images. Computer processor 48 assesses which projector ray 36 projected each of the plurality of detected features 38' of projected pattern 34, as detected in the between-state image by:

(a) analyzing the series of images (step 60) and determining which detected features 38' of projected pattern 34, as detected in the between-state image, can be tracked across the series of images, (b) solving a correspondence algorithm (step 62) for the tracked detected features 38' of projected pattern 34 in at least one of the images of the series of images other than the between-state image, and (c) using the solved correspondence algorithm for tracked detected features 38' of projected pattern 34 to solve the correspondence algorithm for tracked detected features 38' of projected pattern 34 as detected in the between-state image (step 64).

Figure 7A:
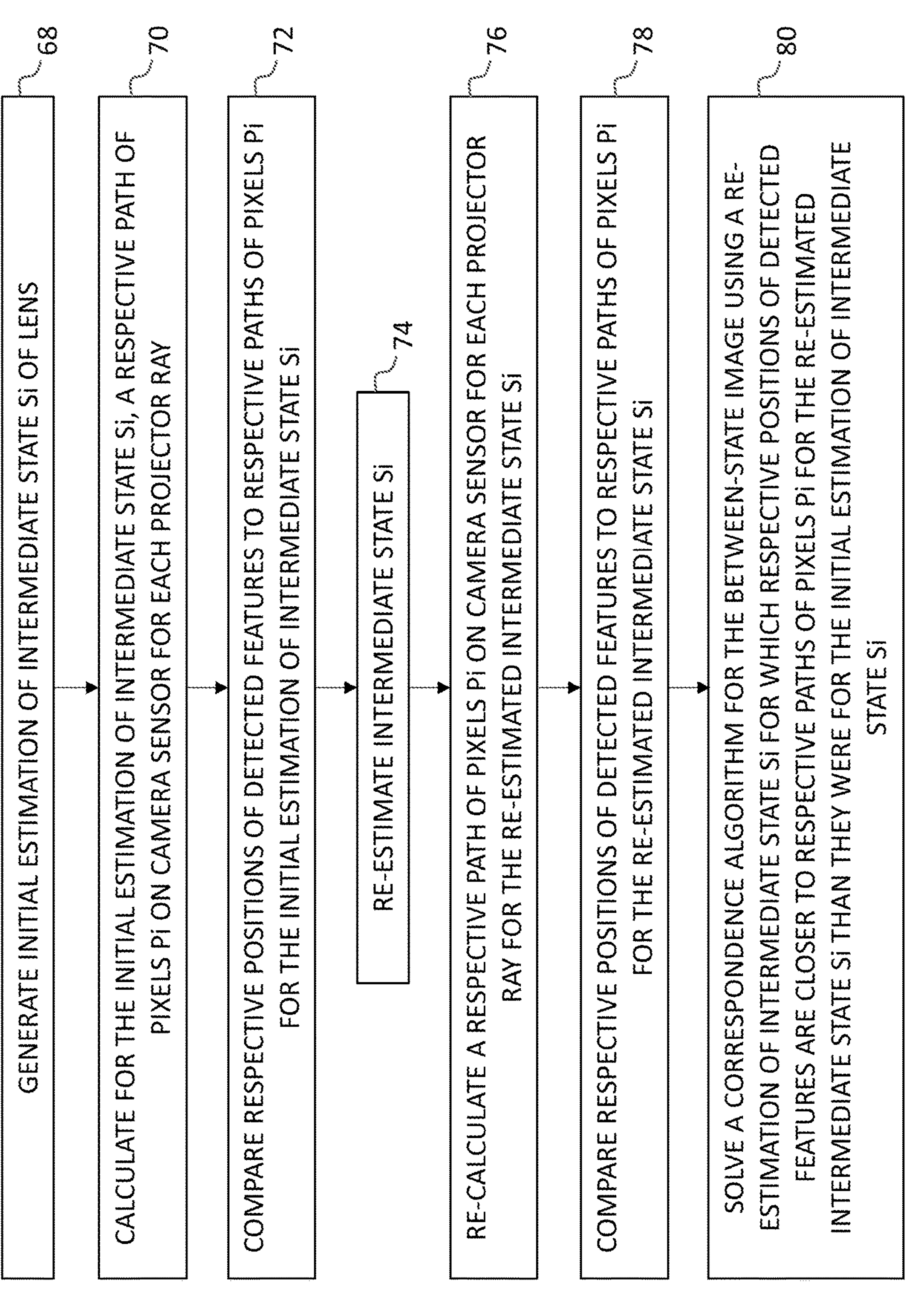

Reference is now made to FIG. 7A, which is a flowchart depicting steps performed by computer processor 48 for estimating intermediate state Si of lens 44 for a between-state image and solving a correspondence algorithm for the between-state image, in accordance with some applications of the present disclosure. In some applications, the apparatus further includes control circuitry 66 (shown in FIG. 1) configured to drive lens 44 to change state, such that lens 44 changes state in response to a lens-state-change command by control circuitry 66. For some applications, additionally or alternatively to the techniques described hereinabove for estimating intermediate state Si of lens 44 for a between-state image, computer processor 48 may generate an initial estimation of intermediate state Si, between two discrete states Sn and Sn+1, based on a lens-state-change command by the control circuitry 66.

Based on the stored calibration values for the two discrete states Sn and Sn+1, computer processor 48 calculates the respective path of pixels Pi for each projector ray 36 for the initial estimation of intermediate state Si and compares the respective positions of a plurality of detected features 38', as detected in the between-state image, to respective paths of pixels Pi for the initial estimation of intermediate state Si. If the respective positions of the plurality of detected features 38' do not appear to match up to paths of pixels Pi then, based on the comparison, computer processor 48 re-estimates intermediate state Si, re-calculates the paths of pixels Pi for each projector ray 36 for the re-estimated intermediate state Si, and compares again to the respective positions of the plurality of detected features 38'. The above steps of re-estimation and re-calculation of the paths of pixels may be performed iteratively until a match is found between the respective positions of the plurality of detected features 38' and the re-estimated intermediate state Si. Once a match is found, computer processor 48 has identified the intermediate state Si of lens 44.

Thus, for some applications, computer processor 48 computes respective three-dimensional positions on intraoral three-dimensional surface 28 of the plurality of features 38 of pattern 34 of light detected in the between-state image by:

(i) generating an initial estimation of intermediate state Si (step 68) based on a lens-state-change command by control circuitry 66, (ii) based on the stored calibration values for camera 40 determined for discrete states Sn and Sn+1, calculating for the initial estimation of intermediate state Si of lens 44 a respective path Pi of pixels on camera sensor 42 for each projector ray 36 (step 70), (iii) comparing the respective positions of the plurality of detected features 38' of the pattern 34 of light detected in the between-state image to respective paths Pi of pixels for the initial estimation of intermediate state Si (step 72), and (iv) based on the comparing:

re-estimating intermediate state Si (step 74), recalculating respective path Pi of pixels on the camera sensor for each projector ray for the re-estimated intermediate state Si (step 76), comparing the respective positions of the plurality of detected features 38' of the pattern 34 of light detected in the between-state image to respective paths Pi of pixels for the re-estimated intermediate state Si (step 78), and using a re-estimation of intermediate state Si for which the plurality of detected features 38' are closer to respective paths Pi of pixels for the re-estimated intermediate state Si than the plurality of detected features 38' were for the initial estimation of intermediate state Si, solving a correspondence algorithm (step 80) to assess which projector ray 36 projected each of the plurality of features 38 of the projected pattern 34, as detected in the between-state image.

Figure 7B:
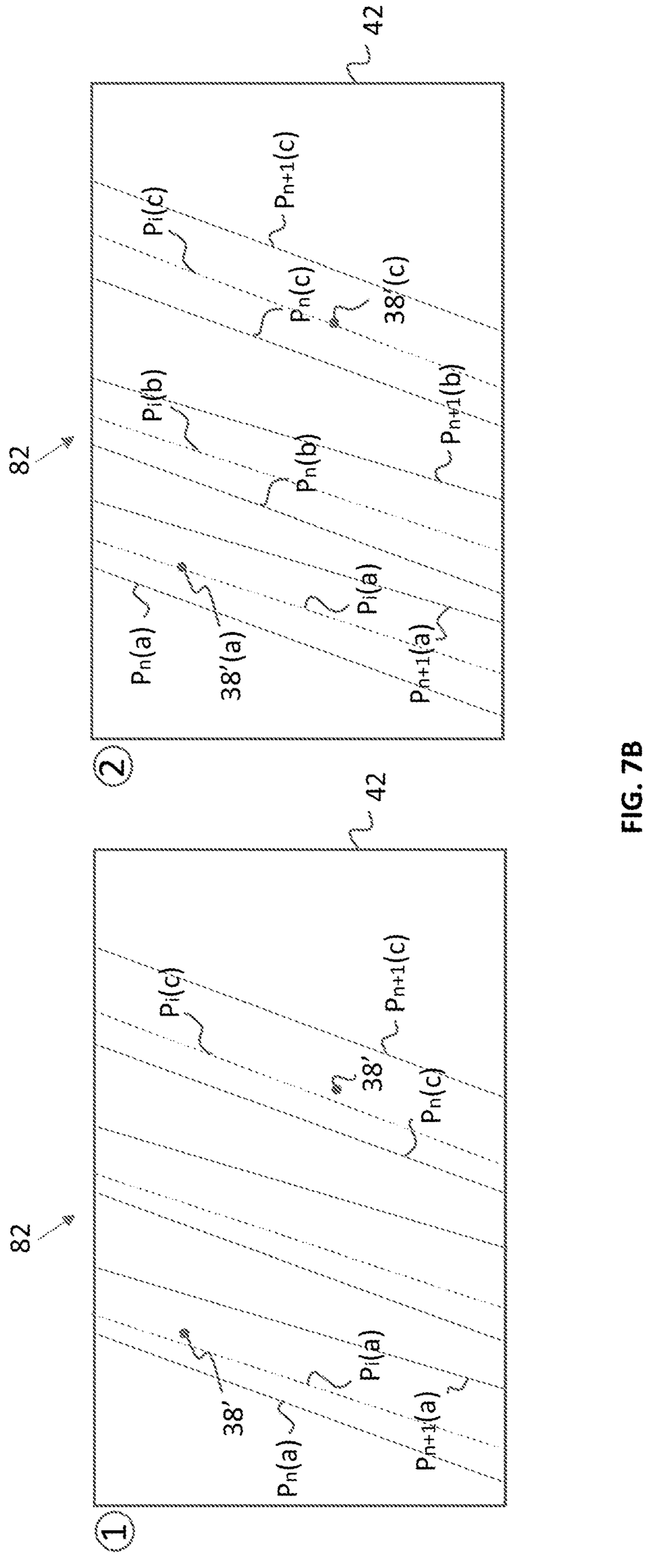
FIG. 7B is a schematic illustration of the camera sensor showing a simplified example of the steps performed by the computer processor depicted in FIG. 7A, in accordance with some applications of the present disclosure.

Reference is now made to FIG. 7B, which is a schematic illustration of camera sensor 42 showing a simplified example of the steps performed by computer processor 48 depicted in FIG. 7A, in accordance with some applications of the present disclosure. Camera sensor 42 is shown depicting two versions of a between-state image 82 with two detected features 38'. The first version of between-state image 82 shows respective paths of pixels Pi(a), Pi(b), and Pi(c) for three projector rays 36(*a*), 36(*b*), and 36(*c*) for an initial estimation of intermediate state Si of lens 44 between discrete states Sn and Sn+1. As shown, neither of the two detected features 38' are close enough to any path of pixels in order for computer processor 48 to determine the correspondence between the detected features 38' and respective projector rays 36. The second version of between state image 82 shows the re-calculated respective paths of pixels Pi(a), Pi(b), and Pi(c) for the same three projector rays 36(*a*), 36(*b*), and 36(*c*) after computer processor has re-estimated intermediate state Si for lens 44 based on the comparison in the first version of between-state image 82. As shown, the two detected features 38' are now close enough to specific paths of pixels for computer processor 48 to solve a correspondence algorithm, thus determining that one of the detected features 38'(*a*) was projected by projector ray 36(*a*) and the other of the detected features 38'(*c*) was projected by projector ray 36(*c*).

Figure 8A:
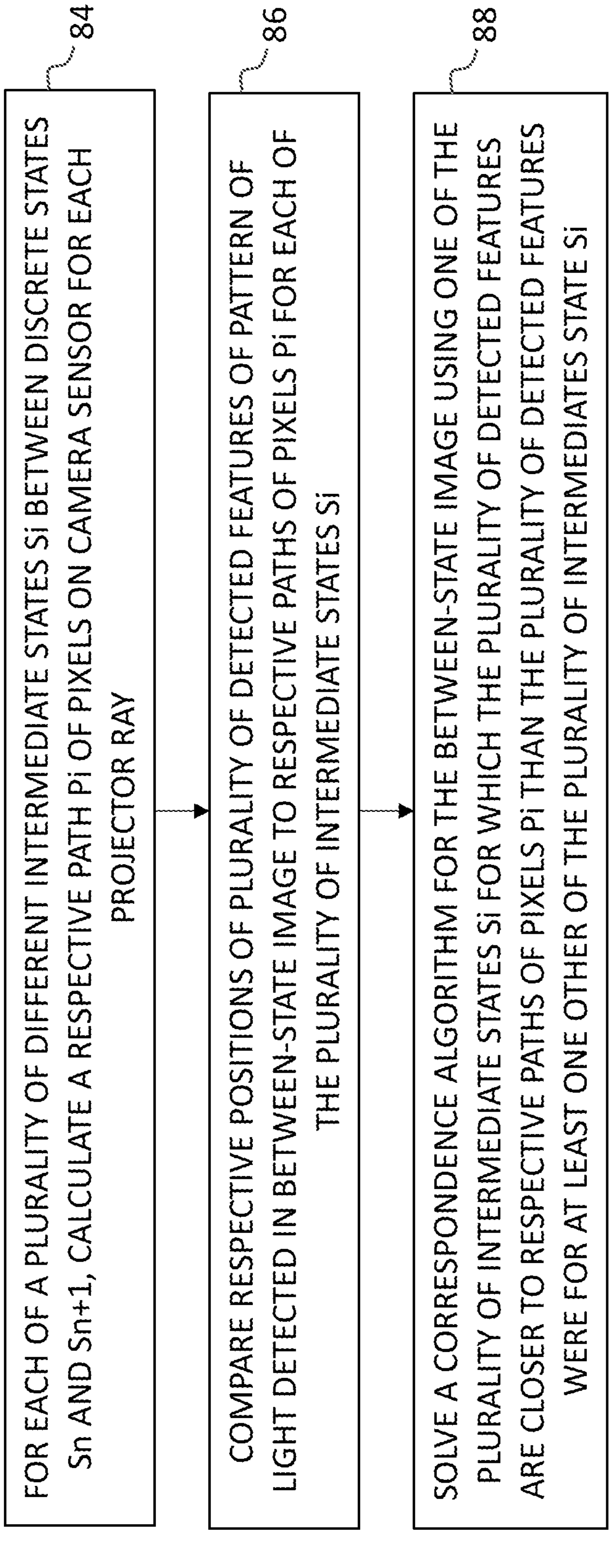
FIG. 8A is a flowchart depicting steps performed by the computer processor, in accordance with some applications of the present disclosure.

Reference is now made to FIG. 8A, which is a flowchart depicting steps performed by computer processor 48 for estimating intermediate state Si of lens 44 for a between-state image and solving a correspondence algorithm for the between-state image, in accordance with some applications of the present disclosure. For some applications, even without an initial estimation for intermediate state Si, a brute-force method may be used whereby computer processor recalculates respective paths Pi for each projector ray 36 for a plurality of different intermediate states Si of lens 44 between discrete states Sn and Sn+1 until finding the intermediate state Si in which a plurality of detected features 38' are close enough to respective paths of pixels Pi for that intermediate state Si such that computer processor 48 can solve a correspondence algorithm for the between-state image.

Thus, for some applications, computer processor 48 computes the respective three-dimensional positions on intraoral three-dimensional surface 28 of the plurality of features 38 of pattern 34 of light detected in a between-state image by:

(i) based on stored calibration values for camera 40 determined for discrete states Sn and Sn+1, for each of a plurality of different intermediate states Si between discrete states Sn and Sn+1, calculating a respective path Pi of pixels on camera sensor 42 for each projector ray 36 (step 84), (ii) comparing the respective positions of the plurality of detected features 38' of pattern 34 of light detected in the between-state image to respective paths of pixels Pi for each of the plurality of intermediate states Si (step 86), and (iii) using one of the plurality of intermediate states Si for which the plurality of detected features 38' are closer to respective paths of pixels Pi for the one of the plurality of intermediate states Si than the plurality of detected features were for at least one other of the plurality of intermediates state Si, solving a correspondence algorithm (step 88) to assess which projector ray 36 projected each of the plurality of features 38 of the projected pattern 34, as detected in the between-state image.

Figure 8B:
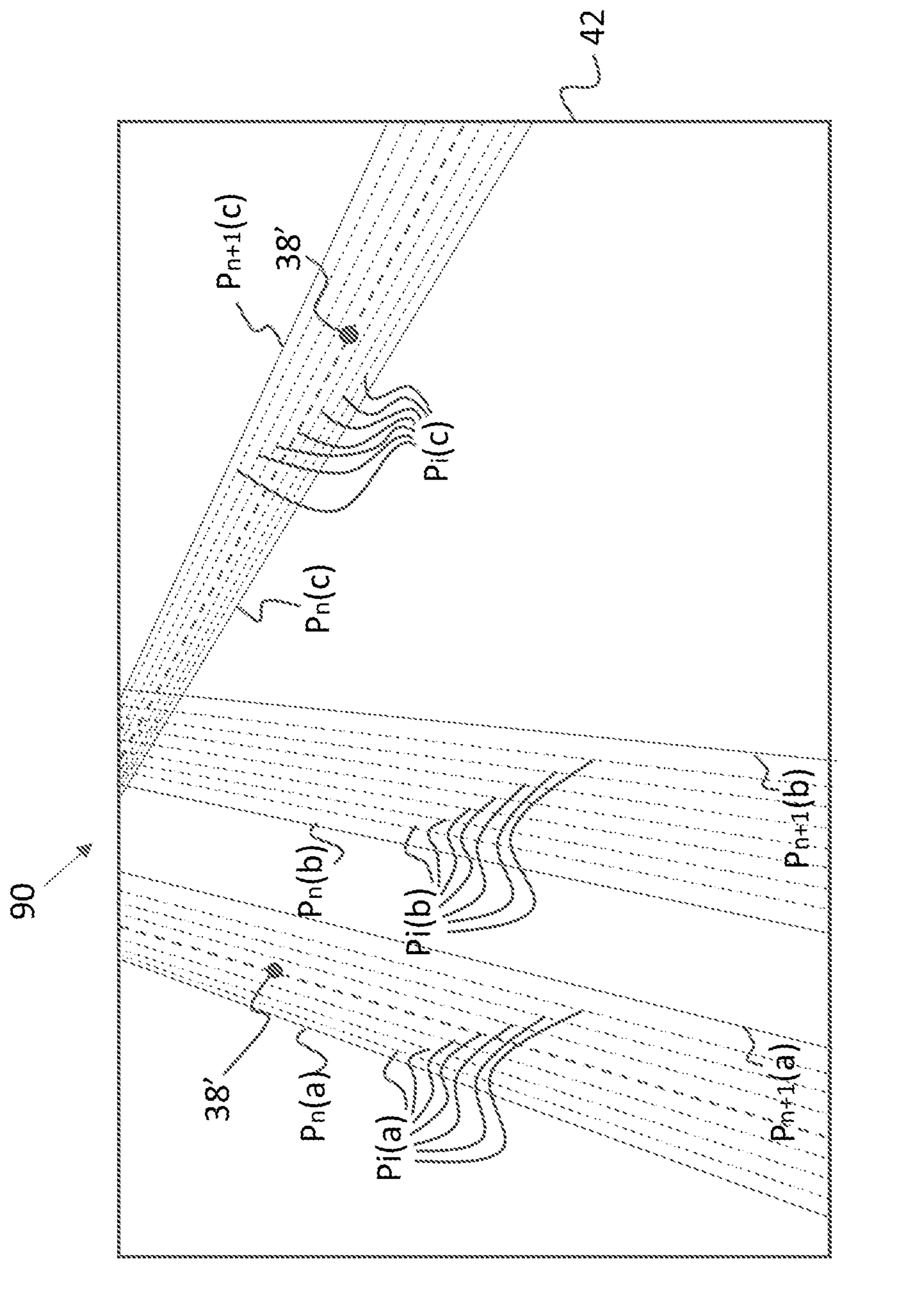
FIG. 8B is a schematic illustration of the camera sensor showing a simplified example of the steps performed by computer processor depicted in FIG. 8A, in accordance with some applications of the present disclosure.

Reference is now made to FIG. 8B, which is a schematic illustration of camera sensor 42 showing a simplified example of the steps performed by computer processor 48 depicted in FIG. 8A, in accordance with some applications of the present disclosure. Camera sensor 42 is shown depicting a between-state image 90 with two detected features 38'. Between-state image 90 shows respective paths of pixels Pi(a), Pi(b), and Pi(c) for three projector rays 36(*a*), 36(*b*), and 36(*c*) for a plurality of intermediate states Si of lens 44 between discrete states Sn and Sn+1. As shown by way of simplified example, seven paths of pixels Pi on camera sensor 42 are calculated for each of three projector rays 36(*a*), 36(*b*), and 36(*c*), the seven paths corresponding to seven possible intermediate states Si of lens 44. The two detected features 38' match, respectively, with a path of pixels Pi(a) and Pi(c) corresponding to projector rays 36(*a*) and 36(*c*) for the fourth intermediate state Si of lens 44 from discrete state Sn. Thus, using the specific intermediate state Si for which the detected features 38' are closer, e.g., match, respective paths of pixels Pi for that specific intermediate state Si, computer processor 48 solves a correspondence algorithm thus determining that one of the detected features 38' was projected by projector ray 36(*a*) and the other of the detected features 38' was projected by projector ray 36(*c*).

Figure 9:
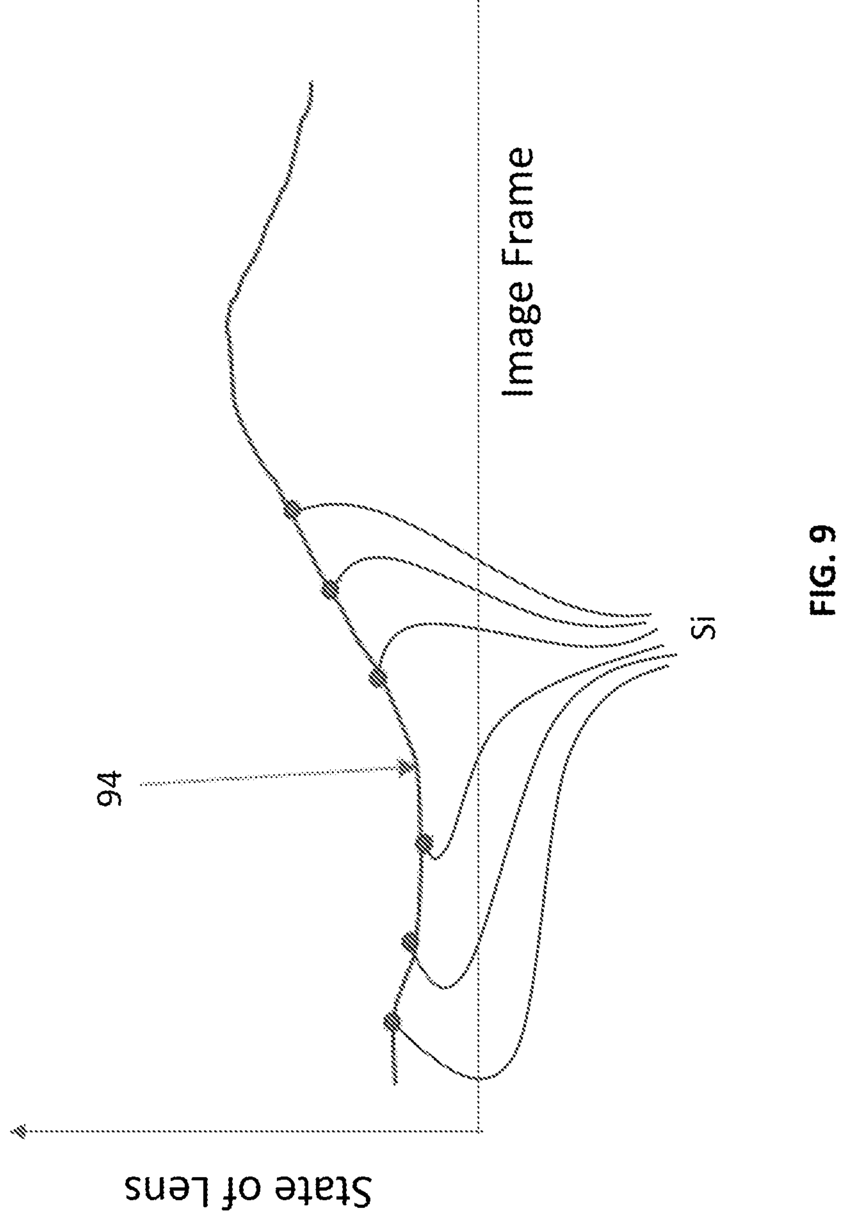
FIG. 9 is a schematic illustration showing an intermediate state of the lens for a series of image frames, in accordance with some applications of the present disclosure.

Reference is now made to FIG. 9, which is a schematic illustration showing intermediate state Si of lens 44 for a series of image frames, in accordance with some applications of the present disclosure. For some applications, elongate wand 20 for intraoral scanning includes one or more non-structured light projectors 92 (shown in FIG. 1) for illuminating intraoral three-dimensional surface 28 with non-structured light. For example, non-structured light projector(s) 92 may be broadband light, e.g., broadband LED (s), or Near Infrared (NIR) light, e.g., NIR LED(s). For some applications, camera 40 captures a 2D image of intraoral three-dimensional surface 28 under the illumination of non-structured light projector(s) 92. However, the 2D image of intraoral three-dimensional surface 28 under the illumination of non-structured light projector(s) 92 does not contain structured light information. Thus, the above-described methods of estimating intermediate state Si for a between-state image based on the relative positioning of detected features 38' and paths of pixels on camera sensor 42 is not applicable to 2D images of intraoral three-dimensional surface captured under the illumination of non-structured light projector(s) 92.

In some applications, however, the image frames of non-structured light are interspersed between image frames of structured light. As such, for some applications, for a between-state 2D image captured by camera 40 when lens 44 is in an intermediate state between discrete states Sn of the lens, computer processor 48 estimates the intermediate state Si of lens 44 based on image frames captured using structured light projector(s) 30 that proceed and follow the capturing of the 2D between-state image. For example, for a non-structured light image frame, computer processor 48 interpolates between the estimated intermediate states Si of lens 44 for the structured light image frames proceeding and following the non-structured frame. Arrow 94 in FIG. 9 indicates a non-structured light image frame for which computer processor may interpolate the intermediate state Si of lens 44 based on the adjacent data points which represent intermediate state Si for structured light image frames.

Figure 10:
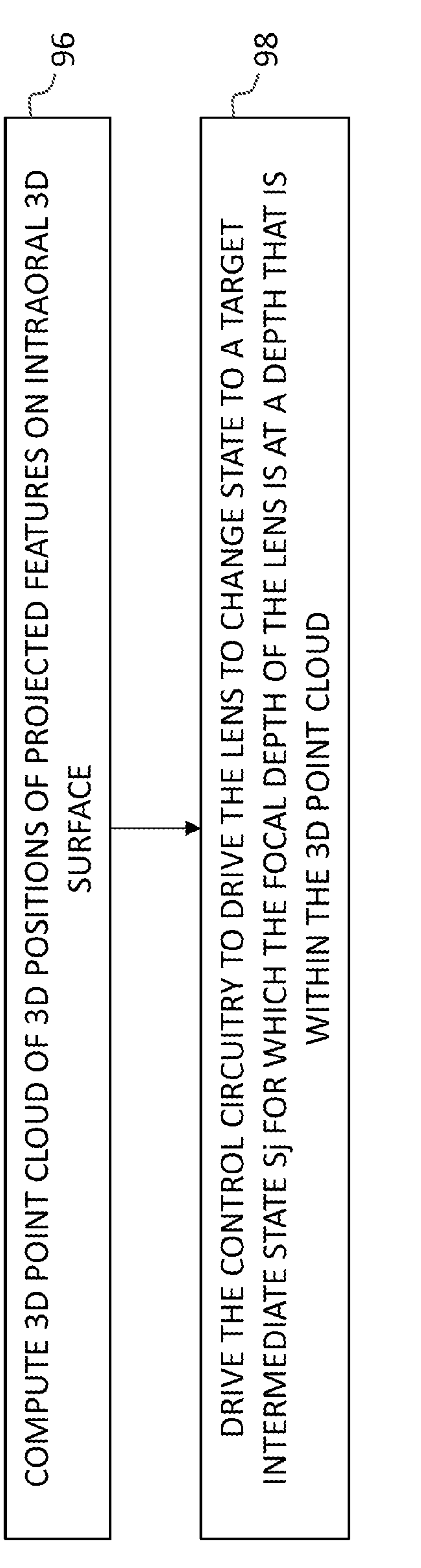
FIG. 10 is a flowchart depicting steps performed by the computer processor for selecting a target intermediate state of the lens, in accordance with some applications of the present disclosure.

Reference is now made to FIG. 10, which is a flowchart depicting steps performed by computer processor 48 for selecting a target intermediate state Sj of lens 44, in accordance with some applications of the present disclosure. For some applications, control circuitry 66 may be used to drive lens 44 to change to a target intermediate state Sj in order to capture an image using a target focal depth of lens 44. During a calibration process of camera 40, in addition to the calibration values indicating a camera ray 52 for each pixel on camera sensor 42, the stored calibration values for camera 40 indicate the focal depth of lens 44 for each of the plurality of discrete states Sn of lens 44. This allows computer processor 48 to interpolate the focal depth of lens 44 for target intermediate states Si of lens between two discrete states Sn and Sn+1 of lens 44. During an intraoral scan, computer processor 48 may drive control circuitry 66 to drive lens 44 to change state to a target intermediate state Sj in order to capture an image at the interpolated focal depth corresponding to target intermediate state Sj.

In some applications, for each structured light image frame during an intraoral scan, computer processor 48 computes a 3D point cloud where each point is a three-dimensional position on intraoral three-dimensional surface 28 of a projected feature 38 of projected pattern 34. For some applications, after computing a 3D point cloud, it may be advantageous to the intraoral scan to move the focal depth of camera 40 to a depth that is within the 3D point cloud. Thus, for some applications, (i) based on a previous image frame captured by camera 40, computer processor 48 computes a 3D point cloud (step 96) of three-dimensional positions of projected features 38 of pattern 34 of light on intraoral three-dimensional surface 28, and (ii) based on the stored calibration values for camera 40 that indicate the focal depth of lens 44 for each of the plurality of discrete states Sn, computer processor 48 drives control circuitry 66 to drive lens 44 to change state (step 98) to a target intermediate state Sj for which the focal depth of lens 44 is at a depth that is within the 3D point cloud, the target intermediate state Sj being between two discrete states Sn and Sn+1.

For some applications, in step 98 computer processor 48 may drive control circuitry 66 to drive lens 44 to change state to a target intermediate state Sj in order to focus at a specific depth within the 3D point cloud. For example, for some applications, based on the stored calibration values for camera 40 that indicate the focal depth of lens 44 for each of the plurality of discrete states Sn, computer processor 48 may drive control circuitry 66 to drive lens 44 to change state to a target intermediate state Sj for which the focal depth of lens 44 is at the three-dimensional center of the 3D point cloud. Alternatively or additionally, for some applications, computer processor 48 may (a) filter the 3D point cloud in order to remove from the 3D point cloud features 38 of pattern 34 of light that were projected onto soft tissue, and (b) drive control circuitry 66 to drive lens 44 to change state to a target intermediate state Sj for which the focal depth of lens 44 is at the three-dimensional center of the filtered 3D point cloud.

Alternatively or additionally, for some applications, in step 98 computer processor 48 may drive control circuitry 66 to drive lens 44 to change state to a target intermediate state Sj in order to focus on a range of depths or a specific region of interest within the 3D point cloud. For example, for some applications, based on the stored calibration values for camera 40 that indicate the focal depth of lens 44 for each of the plurality of discrete states Sn, computer processor 48 may optimize focus of lens 44 over a range of focal depths spanning two points u1 and u2 within the 3D point cloud by driving control circuitry 66 to drive lens 44 to change state to a target intermediate state Sj for which the focal depth of lens 44 is at the harmonic mean between u1 and u2. Alternatively or additionally, based on the previous image frame, computer processor 48 may determine a region of interest within the 3D point cloud, and based on the stored calibration values for camera 40 that indicate the focal depth of lens 44 for each of the plurality of discrete states Sn, drive control circuitry 66 to drive lens 44 to change state to a target intermediate state Sj for which the focal depth of lens 44 is at a depth that is within the determined region of interest within the 3D point cloud.

Figure 11:
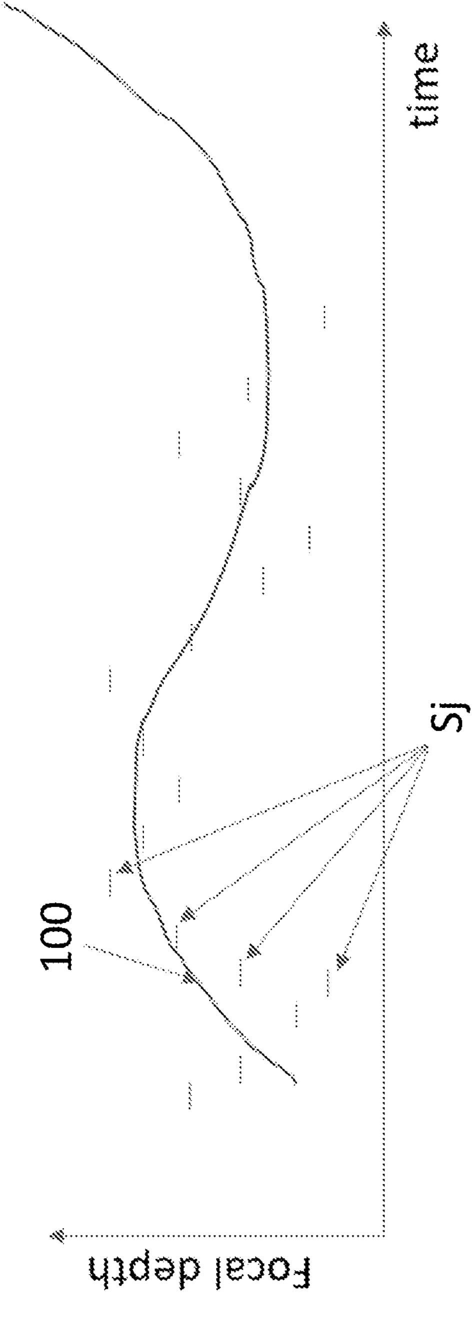
FIG. 11 is a schematic illustration depicting how the computer processor may drive control circuitry to drive the lens to oscillate between a plurality of target intermediate states, in accordance with some applications of the present disclosure.

Reference is now made to FIG. 11, which is a schematic illustration depicting how computer processor 48 may drive control circuitry 66 to drive lens 44 to oscillate between a plurality of target intermediate states Sj, in accordance with some applications of the present disclosure. For some applications, in order to improve focus during an intraoral scan, computer processor 48 may drive control circuitry 66 to drive lens 44 to oscillate between a plurality of target intermediate states Sj for which the respective focal depths of lens 44 span a range of depths that are within the 3D point cloud. For example, computer processor 48 may drive control circuitry 66 to drive lens 44 to oscillate between (i) at least one target intermediate state Sj for which the focal depth of lens 44 is a depth that is nearer than the three-dimensional center of the 3D point cloud and (ii) at least one target intermediate state Sj for which the focal depth of lens 44 is a depth that is farther than the three-dimensional center of the 3D point cloud. Curve 100, which plots the three-dimensional center of the point cloud over time, illustrates that as the intraoral scanner is moved around within the intraoral cavity, the depth of the relative point, e.g., center or center of gravity, of the 3D point cloud changes depth with respect to lens 44. Target intermediate states Sj (depicted as short horizontal bars on the graph of FIG. 11) illustrate a series of target intermediate states Sj of lens 44 that oscillate between having a focal depth that is nearer and a focal depth that is farther than the three-dimensional center of the 3D point cloud.

Figure 12:
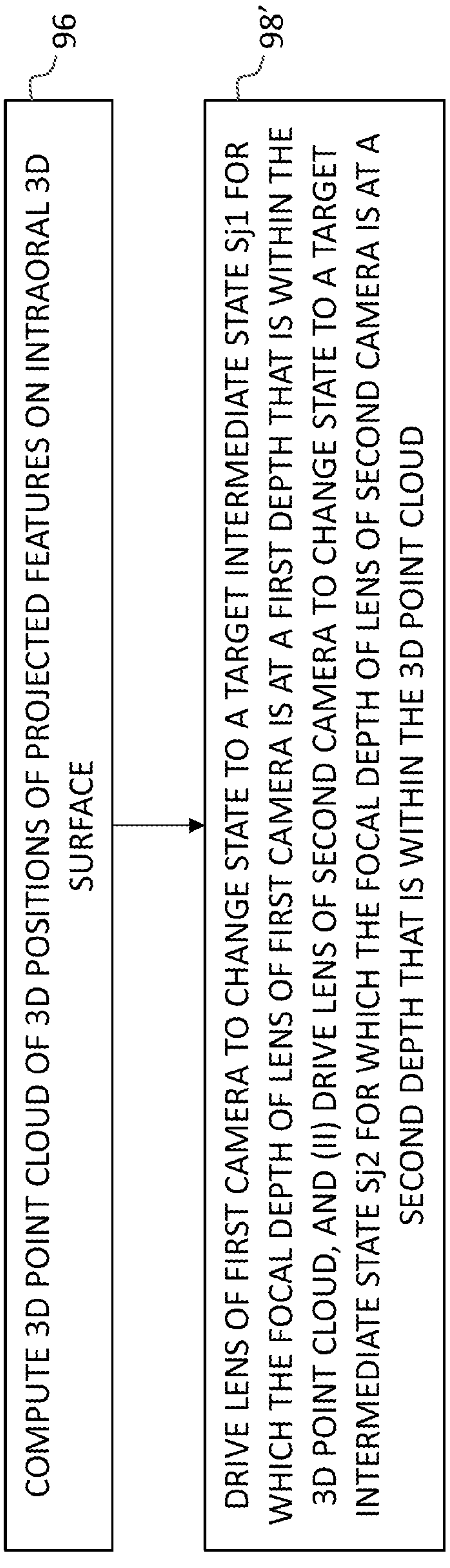
FIG. 12 is a flowchart depicting steps performed by the computer processor for selecting target intermediate states of respective lenses of first and second cameras, in accordance with some applications of the present disclosure.

Reference is now made to FIG. 12, which is a flowchart depicting steps performed by computer processor 48 for selecting target intermediate states Sj1 and Sj2 of respective lenses 44 of first and second cameras 40, in accordance with some applications of the present disclosure. Reference is also made again to FIG. 1. For some applications, the intraoral scanner includes more than one camera 40, e.g., at least two cameras 40. For example, camera 40 as described hereinabove with reference to FIGS. 1-11 may be a first camera 40 and the intraoral scanner may further include a second camera 40. It is noted that FIG. 1 shows three cameras 40 by way of example only and not limitation. Within the scope of the present disclosure is for wand 20 to include only one camera 40 or alternatively more than one camera 40. Second camera 40 captures images that depict at least a plurality of detected features 38' of projected pattern 34 of light on intraoral three-dimensional surface, and has a lens 44 that is configured to focus at a plurality of different focal depths. In addition to driving lens 44 of first camera 40 to change state, control circuitry 66 drives lens 44 the second camera 40 to change state. Alternatively, each lens 44 of respective cameras 40 is driven by separate control circuitry (configuration not shown).

Computer processor 48 stores respective sets of calibration values for each camera 40. For example, in addition to the stored calibration values stored for first camera 40 as described hereinabove, computer processor 48 also stores calibration values for second camera 40 determined for each of a plurality of discrete states Sn of the lens of the second camera, each discrete state Sn of lens 44 of second camera 40, each discrete state Sn of lens 44 of second camera 40 having a distinct focal depth and distinct optical magnification and/or other optical distortion(s). Similarly to as described hereinabove, the stored calibration values for second camera 40 also indicate the focal depth of lens 44 of second camera 40 for each of the plurality of discrete states Sn of lens 44.

FIG. 12 shows the same step 96 as FIG. 10, in which computer processor 48 computes the 3D point cloud based on a previous image frame. Step 98' is a modification of step 98 in which, based on the stored calibration values for first and second cameras 40 that indicate the respective focal depths of lens 44 for each of the plurality of discrete states Sn for each of first and second cameras 40, computer processor 48 drives control circuitry 66 to (i) drive lens 44 of first camera 40 to change state to a target intermediate state Sj1 for which the focal depth of lens 44 of first camera 40 is at a first depth that is within the 3D point cloud, and (ii) drive lens 44 of second camera 40 to change state to a target intermediate state Sj2 for which the focal depth of lens 44 of second camera 40 is at a second depth that is within the 3D point cloud.

For some applications, in order to improve focus over a range of depths within the 3D point cloud, the range of depths may be split between more than one camera 40. For example, for some applications, based on the stored calibration values for first and second camera 40 as described hereinabove, computer processor 48 drives control circuitry 66 to (i) drive lens 44 of first camera 40 to oscillate between a plurality of target intermediate states Sj1 for which the respective focal depths of lens 44 of first camera 40 span a first range of depths that are within the 3D point cloud, and (ii) drive lens 44 of second camera 40 to oscillate between a plurality of target intermediate states Sj2 for which the respective focal depths of lens 44 of second camera 40 span a second range of depths that are within the 3D point cloud.

Applications of the disclosure described herein can take the form of a computer program product accessible from a computer-usable or computer-readable medium (e.g., a non-transitory computer-readable medium) providing program code for use by or in connection with a computer or any instruction execution system, such as computer processor 48. For the purpose of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. In some applications, the computer-usable or computer readable medium is a non-transitory computer-usable or computer readable medium.

Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD. For some applications, cloud storage, and/or storage in a remote server is used.

A data processing system suitable for storing and/or executing program code will include at least one processor (e.g., computer processor 48) coupled directly or indirectly to memory elements through a system bus. The memory elements can include local memory employed during actual execution of the program code, bulk storage, and cache memories which provide temporary storage of at least some program code in order to reduce the number of times code is retrieved from bulk storage during execution. The system can read the inventive instructions on the program storage devices and follow these instructions to execute the methodology of the embodiments of the disclosure.

Network adapters may be coupled to the processor to enable the processor to become coupled to other processors or remote printers or storage devices through intervening private or public networks. Modems, cable modem and Ethernet cards are just a few of the currently available types of network adapters.

Computer program code for carrying out operations of the present disclosure may be written in any combination of one or more programming languages, including an object-oriented programming language such as Java, Smalltalk, C++ or the like and conventional procedural programming languages, such as the C programming language or similar programming languages.

It will be understood that the methods described herein can be implemented by computer program instructions. These computer program instructions may be provided to a processor of a general-purpose computer, special purpose computer, or other programmable data processing apparatus to produce a machine, such that the instructions, which execute via the processor of the computer (e.g., computer processor 48) or other programmable data processing apparatus, create means for implementing the functions/acts specified in the methods described in the present application. These computer program instructions may also be stored in a computer-readable medium (e.g., a non-transitory computer-readable medium) that can direct a computer or other programmable data processing apparatus to function in a particular manner, such that the instructions stored in the computer-readable medium produce an article of manufacture including instruction means which implement the function/act specified in the methods described in the present application. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the methods described in the present application.

Computer processor 48 may be a hardware device programmed with computer program instructions to produce a special purpose computer. For example, when programmed to perform the methods described herein, the computer processor may act as a special purpose computer processor. In some applications, the operations described herein that are performed by computer processors transform the physical state of a memory, which is a real physical article, to have a different magnetic polarity, electrical charge, or the like depending on the technology of the memory that is used.

Figure 13:
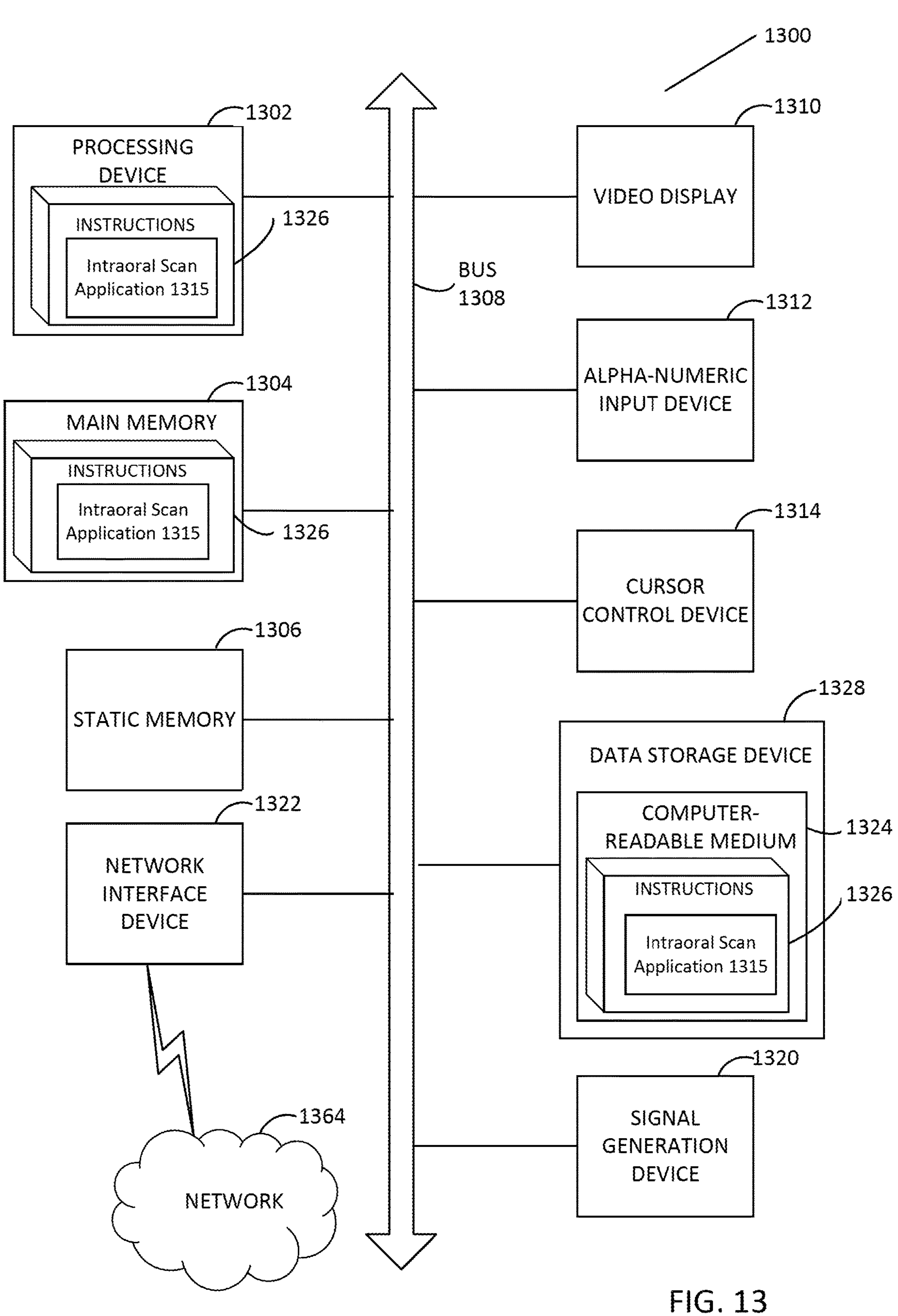
FIG. 13 illustrates a block diagram of an example computing device, in accordance with some applications of the present disclosure.

FIG. 13 illustrates a diagrammatic representation of a machine in the example form of a computing device 1300 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may connect to an intraoral scanner (e.g., wand 20 of FIG. 1) via a wired or wireless connection. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term “machine” shall also be taken to include any collection of machines (e.g., computers) that individually or jointly execute a set (or multiple sets) of instructions to perform any one or more of the methodologies discussed herein.

The example computing device 1300 includes a processing device 1302, a main memory 1304 (e.g., read-only memory (ROM), flash memory, dynamic random access memory (DRAM) such as synchronous DRAM (SDRAM), etc.), a static memory 1306 (e.g., flash memory, static random access memory (SRAM), etc.), and a secondary memory (e.g., a data storage device 1328), which communicate with each other via a bus 1308. In some applications, processing device 1302 corresponds to processor 48 of FIG. 1.

Processing device 1302 represents one or more general-purpose processors such as a microprocessor, central processing unit, or the like. More particularly, the processing device 1302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. Processing device 1302 is configured to execute the processing logic (instructions 1326) for performing operations and steps discussed herein.

The computing device 1300 may further include a network interface device 1322 for communicating with a network 1364. The computing device 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1320 (e.g., a speaker).

The data storage device 1328 may include a machine-readable storage medium (or more specifically a non-transitory computer-readable storage medium) 1324 on which is stored one or more sets of instructions 1326 embodying any one or more of the methodologies or functions described herein, such as instructions for intraoral scan application 1315, which may perform any of the operations discussed hereinabove such as, for example, operations for determining calibration of an intraoral scanner, for performing correspondence between projector rays and camera rays, and so on. A non-transitory storage medium refers to a storage medium other than a carrier wave. The instructions 1326 may also reside, completely or at least partially, within the main memory 1304 and/or within the processing device 1302 during execution thereof by the computing device 1300, the main memory 1304 and the processing device 1302 also constituting computer-readable storage media.

The computer readable storage medium 1324 may also store a software library containing methods for the intraoral scan application 115. While the computer-readable storage medium 1324 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave (e.g., a non-transitory computer-readable medium) that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

It will be appreciated by persons skilled in the art that the present disclosure is not limited to what has been particularly shown and described hereinabove. Rather, the scope of the present disclosure includes both combinations and subcombinations of the various features described hereinabove, as well as variations and modifications thereof that are not in the prior art, which would occur to persons skilled in the art upon reading the foregoing description.

What is claimed is:

1. An apparatus for intraoral scanning, comprising:

one or more structured light projectors configured to project a pattern of light onto an intraoral three-dimensional surface;

a camera comprising a focusing lens configured to focus at a plurality of different focal depths, wherein each of the plurality of different focal depths is associated with a distinct optical distortion, and wherein the camera is to capture images of at least a portion of the pattern of light projected onto the intraoral three-dimensional surface at one or more of the plurality of different focal depths;

control circuitry to change a focus position of the focusing lens to cause the camera to capture the images of the intraoral three-dimensional surface at the one or more of the plurality of different focal depths, wherein the change in the focus position causes a change in optical distortion for the camera and a corresponding change in a calibration of the camera associated with the change in the optical distortion; and a processor to determine depths of at least some of a plurality of detected features by solving a correspondence algorithm that relates projector rays to pixels of the camera, taking into consideration the distinct optical distortions of the plurality of different focal depths.

2. The apparatus of claim 1, wherein the control circuitry is to determine, for each image, depths of points on the intraoral three-dimensional surface using a calibration of the camera associated with the focus position at which the image was captured.

3. The apparatus of claim 1, wherein a motion control tolerance for motion of the focusing lens is higher than a target accuracy for the calibration of the camera.

4. The apparatus of claim 1, wherein the pattern of light is defined by the projector rays, each projector ray to project a feature of the pattern, wherein the images of the intraoral three-dimensional surface are to depict a plurality of detected features of the projected pattern of light on the intraoral three-dimensional surface.

5. The apparatus of claim 1, wherein the distinct optical distortion comprises a distinct optical magnification.

6. An apparatus for intraoral scanning, the apparatus comprising:

one or more structured light projectors, each structured light projector configured to project a pattern of light defined by a plurality of projector rays, each projector ray projecting a feature of the pattern, when the structured light projector is activated;

a camera comprising a camera sensor having an array of pixels, wherein:

(a) the camera is configured to capture an image that depicts at least a plurality of detected features of the projected pattern of light on an intraoral three-dimensional surface, and (b) the camera comprises a lens that is configured to focus at a plurality of different focal depths, and a computer processor configured to:

(A) store calibration values for the one or more structured light projectors, (B) store calibration values for the camera determined for each of a plurality of discrete states Sn of the lens, each discrete state Sn of the lens having a distinct focal depth and distinct optical magnification, and (C) for a between-state image captured by the camera when the lens is in an intermediate state Si between two discrete states Sn and Sn+1, the focal depth of the lens in intermediate state Si being between the distinct focal depths of the lens in states Sn and Sn+1, compute respective three-dimensional positions on the intraoral three-dimensional surface of a plurality of features of the pattern of light detected in the between-state image based on (i) the stored calibration values for the camera determined for each of a plurality of discrete states Sn of the lens, and (ii) the stored calibration values for the one or more structured light projectors.

7. The apparatus according to claim 6, wherein the apparatus comprises an elongate wand comprising a probe at a distal end of the elongate wand, and the camera is disposed within the probe.

8. The apparatus according to claim 6, wherein the lens comprises a liquid lens, wherein the liquid lens is configured to change state in response to a change in voltage applied to the liquid lens, each state Sn of the liquid lens having a distinct focal depth and distinct optical magnification.

9. The apparatus according to claim 6, wherein the lens is configured to move to a plurality of different positions along an optical axis of the lens, each of the plurality of discrete states Sn of the lens corresponding to a distinct position of the lens, and wherein the intermediate state Si of the lens is an intermediate position of the lens that is between two distinct positions of the lens.

10. The apparatus according to claim 6, wherein the plurality of discrete states Sn is exactly two states S1 and S2.

11. The apparatus according to claim 6, wherein:

(a) the stored calibration values for the camera indicate, for each of the plurality of discrete states Sn of the lens, a camera ray corresponding to each of the pixels, and (b) the stored calibration values for the one or more structured light projectors indicate a projector ray corresponding to each one of the projected features from each one of the one or more structured light projectors, wherein for each of the plurality of discrete states Sn of the lens, each projector ray corresponds to a respective path Pn of pixels on the camera sensor.

12. The apparatus according to claim 11, wherein the computer processor is configured to compute the respective three-dimensional positions on the intraoral three-dimensional surface of the plurality of features of the pattern of light detected in the between-state image by:

solving a correspondence algorithm to assess which projector ray projected each of the plurality of features of the projected pattern, as detected in the between-state image, for each of the plurality of detected features, calculating respective distances D1 and D2 between the detected feature and two closest paths of pixels Pn and Pn+1 on the camera sensor, each path of pixels Pn and Pn+1 corresponding to the projector ray that projected the detected feature for respective discrete states Sn and Sn+1 of the lens, and based on distances D1 and D2 for each of the plurality of detected features, estimating the intermediate state Si of the lens, and updating the stored calibration values to indicate a camera ray corresponding to each pixel on the camera sensor of the camera for the estimated intermediate state Si of the lens, wherein for the estimated intermediate state Si of the lens, each projector ray corresponds to a respective path Pi of pixels on the camera sensor.

13. The apparatus according to claim 12, wherein the computer processor is configured to:

for each of the plurality of detected features, calculate a normalized relative position of the detected feature with respect to the two closest paths of pixels Pn and Pn+1 by normalizing the respective distance D1 with respect to a total distance D1+D2 between the two closest paths of pixels Pn and Pn+1, and based on an average of the normalized relative positions for the plurality of detected features, estimate the intermediate state Si of the lens, and update the stored calibration values to indicate a camera ray corresponding to each pixel on the camera sensor of the camera for the estimated intermediate state Si of the lens.

14. The apparatus according to claim 12, wherein:

the between-state image is a first between-state image captured by the camera when the lens is in the estimated intermediate state Si between two discrete states Sn and Sn+1, and the computer processor is configured to compute the respective three-dimensional positions on the intraoral three-dimensional surface of the plurality of features of the pattern of light detected in a second between-state image captured by the camera when the lens is in a second intermediate state Si+1 between discrete states Sn and Sn+1 by:

solving the correspondence algorithm to assess which projector ray projected each of the plurality of features of the projected pattern as detected in the second between-state image by assuming the same solution to the correspondence algorithm as solved for the plurality of features of the projected pattern as detected in the first between-state image, for each of the plurality of detected features in the second between-state image, calculating (a) a distance Di between the detected feature and the path Pi of pixels on the camera sensor corresponding to the projector ray that projected the detected feature for the intermediate state Si, and (b) a distance D2' between the detected feature and the closest path of pixels Pn+1 on the camera sensor corresponding to the projector ray that projected the detected feature for the discrete state Sn+1 of the lens, and based on distances Di and D2' for each of the plurality of detected features, estimating the second intermediate state Si+1 of the lens, and update the stored calibration values to indicate a camera ray corresponding to each pixel on the camera sensor of the camera for the estimated second intermediate state Si+1 of the lens, wherein for the estimated second intermediate state Si+1 of the lens, each projector ray corresponds to a respective path Pi+1 of pixels on the camera sensor.

15. The apparatus according to claim 11, wherein:

the camera is configured to capture a series of images, each image depicting at least a plurality of detected features of the projected pattern of light on the intraoral three-dimensional surface, wherein the between-state image is an image in the series of images, and the computer processor is configured to assess which projector ray projected each of the plurality of detected features of the projected pattern, as detected in the between-state image by:

(a) analyzing the series of images and determining which detected features of the projected pattern, as detected in the between-state image, can be tracked across the series of images, (b) solving a correspondence algorithm for the tracked detected features of the projected pattern in at least one of the images of the series of images other than the between-state image, and (c) using the solved correspondence algorithm for the tracked detected features of the projected pattern to solve the correspondence algorithm for tracked detected features of the projected pattern as detected in the between-state image.

16. The apparatus according to claim 11, wherein the apparatus further comprises control circuitry configured to drive the lens to change state, and the computer processor is configured to compute the respective three-dimensional positions on the intraoral three-dimensional surface of the plurality of features of the pattern of light detected in the between-state image by:

generating an initial estimation of intermediate state Si based on a lens-state-change command by the control circuitry, based on the stored calibration values for the camera determined for discrete states Sn and Sn+1, calculating for the initial estimation of intermediate state Si of the lens a respective path Pi of pixels on the camera sensor for each projector ray, comparing the respective three-dimensional positions of the plurality of detected features of the pattern of light detected in the between-state image to respective paths Pi of pixels for the initial estimation of intermediate state Si, and based on the comparing:

re-estimating intermediate state Si, recalculating the respective path Pi of pixels on the camera sensor for each projector ray for the re-estimated intermediate state Si, comparing the respective three-dimensional positions of the plurality of detected features of the pattern of light detected in the between-state image to respective paths Pi of pixels for the re-estimated intermediate state Si, and using a re-estimation of intermediate state Si for which the plurality of features are closer to respective paths Pi of pixels for the re-estimated intermediate state Si than the plurality of features were for the initial estimation of intermediate state Si, solving a correspondence algorithm to assess which projector ray projected each of the plurality of features of the projected pattern, as detected in the between-state image.

17. The apparatus according to claim 11, wherein the computer processor is configured to compute the respective three-dimensional positions on the intraoral three-dimensional surface of the plurality of features of the pattern of light detected in the between-state image by:

based on the stored calibration values for the camera determined for discrete states Sn and Sn+1, for each of a plurality of different intermediate states Si between discrete states Sn and Sn+1, calculating a respective path Pi of pixels on the camera sensor for each projector ray, comparing the respective three-dimensional positions of the plurality of detected features of the pattern of light detected in the between-state image to respective paths Pi of pixels for each of the plurality of intermediate states Si, and using one of the plurality of intermediate states Si for which the plurality of detected features are closer to respective paths Pi of pixels for the one of the plurality of intermediate states Si than the plurality of detected features were for at least one other of the plurality of intermediate states Si, solving a correspondence algorithm to assess which projector ray projected each of the plurality of features of the projected pattern, as detected in the between-state image.

18. The apparatus according to claim 6, wherein the apparatus further comprises one or more non-structured light projectors, each non-structured light projector configured to illuminate the intraoral three-dimensional surface with non-structured light, wherein:

the camera is configured to capture a 2D image of the intraoral three-dimensional surface under the illumination of a non-structured light projector of the one or more non-structured light projectors, and for a between-state 2D image captured by the camera when the lens is in an intermediate state Si of the lens between discrete states Sn and Sn+1 of the lens, the computer processor is configured to estimate the intermediate state Si of the lens based on image frames captured using the one or more structured light projectors that precede and follow the capturing of the 2D between-state image.

19. The apparatus according to claim 6, wherein:

the apparatus further comprises control circuitry configured to drive the lens to change state, the stored calibration values for the camera indicate the focal depth of the lens for each of the plurality of discrete states Sn of the lens, and the computer processor is configured to:

based on a previous image frame captured by the camera, compute a 3D point cloud of three-dimensional positions of projected features of the pattern of light on the intraoral three-dimensional surface, and based on the stored calibration values for the camera that indicate the focal depth of the lens for each of the plurality of discrete states Sn, drive the control circuitry to drive the lens to change state to a target intermediate state Sj for which the focal depth of the lens is at a depth that is within the 3D point cloud, the target intermediate state Sj being between two discrete states Sn and Sn+1.

20. The apparatus according to claim 19, wherein the computer processor is configured to, based on the stored calibration values for the camera that indicate the focal depth of the lens for each of the plurality of discrete states Sn, drive the control circuitry to drive the lens to change state to a target intermediate state Sj for which the focal depth of the lens is at a three-dimensional center of the 3D point cloud.

21. The apparatus according to claim 20, wherein the computer processor is configured to (a) filter the 3D point cloud in order to remove from the 3D point cloud features of the pattern of light that were projected onto soft tissue, and (b) drive the control circuitry to drive the lens to change state to a target intermediate state Sj for which the focal depth of the lens is at the three-dimensional center of the filtered 3D point cloud.

22. The apparatus according to claim 19, wherein the computer processor is configured to, based on the stored calibration values for the camera that indicate the focal depth of the lens for each of the plurality of discrete states Sn, optimize focus of the lens over a range of focal depths spanning two points u1 and u2 within the 3D point cloud by driving the control circuitry to drive the lens to change state to a target intermediate state Sj for which the focal depth of the lens is at a harmonic mean between u1 and u2.

23. The apparatus according to claim 19, wherein the computer processor is configured to:

based on the previous image frame, determine a region of interest within the 3D point cloud, and based on the stored calibration values for the camera that indicate the focal depth of the lens for each of the plurality of discrete states Sn, drive the control circuitry to drive the lens to change state to a target intermediate state Sj for which the focal depth of the lens is at a depth that is within the determined region of interest within the 3D point cloud.

24. The apparatus according to claim 19, wherein the computer processor is configured to, based on the stored calibration values for the camera that indicate the focal depth of the lens for each of the plurality of discrete states Sn, drive the control circuitry to drive the lens to oscillate between a plurality of target intermediate states Sj for which the respective focal depths of the lens span a range of depths that are within the 3D point cloud.

25. The apparatus according to claim 24, wherein the computer processor is configured to drive the control circuitry to drive the lens to oscillate between (i) at least one target intermediate state Sj for which the focal depth of the lens is a depth that is nearer than a three-dimensional center of the 3D point cloud and (ii) at least one target intermediate state Sj for which the focal depth of the lens is a depth that is farther than the three-dimensional center of the 3D point cloud.

26. The apparatus according to claim 19, wherein:

(A) the camera is a first camera and the apparatus further comprises a second camera having an array of pixels, wherein the second camera (i) is configured to capture an image that depicts at least a plurality of detected features of the projected pattern of light on the intraoral three-dimensional surface, and (ii) comprises a lens that is configured to focus at a plurality of different focal depths, (B) the control circuitry is configured to drive the lens of the second camera to change state, and (C) the computer processor is configured to:

store calibration values for the second camera determined for each of a plurality of discrete states Sn of the lens of the second camera, each discrete state Sn of the lens having a distinct focal depth and distinct optical magnification, wherein the stored calibration values for the second camera indicate the focal depth of the lens for each of the plurality of discrete states Sn of the lens, and based on the stored calibration values for the first camera and the second camera that indicate the respective focal depths of the lens for each of the plurality of discrete states Sn for each of the first and second cameras, drive the control circuitry to (i) drive the lens of the first camera to change state to a target intermediate state Sj1 for which the focal depth of the lens is at a first depth that is within the 3D point cloud, and (ii) drive the lens of the second camera to change state to a target intermediate state Sj2 for which the focal depth of the lens is at a second depth that is within the 3D point cloud.

27. The apparatus according to claim 26, wherein the computer processor is configured to, based on the stored calibration values for the first camera and the second camera that indicate the respective focal depths of the lens for each of the plurality of discrete states Sn for each of the first and second cameras, drive the control circuitry to (i) drive the lens of the first camera to oscillate between a plurality of target intermediate states Sj1 for which the respective focal depths of the lens of the first camera span a first range of depths that are within the 3D point cloud, and (ii) drive the lens of the second camera to oscillate between a plurality of target intermediate states Sj2 for which the respective focal depths of the lens of the second camera span a second range of depths that are within the 3D point cloud.

* * * * *